(12) United States Patent
O'Hara et al.

(10) Patent No.: US 7,733,961 B2
(45) Date of Patent: Jun. 8, 2010

(54) REMOTE SENSING IMAGERY ACCURACY ANALYSIS METHOD AND APPARATUS

(75) Inventors: Charles G. O'Hara, Columbus, MS (US); Anil Cheriyadat, Troy, NY (US); Suyoung Seo, Starkville, MS (US); Bijay Shrestha, Starkville, MS (US); Veeraraghavan Vijayaraj, Knoxville, TN (US); Nicolas H. Younan, Starkville, MS (US)

(73) Assignee: Mississippi State University Research and Technology Corporation, Mississippi, MS (US)

( * ) Notice: Subject to any disclaimer, the term of this patent is extended or adjusted under 35 U.S.C. 154(b) by 721 days.

(21) Appl. No.: 11/279,982

(22) Filed: Apr. 17, 2006

(65) Prior Publication Data

US 2006/0269158 A1 Nov. 30, 2006

Related U.S. Application Data

(60) Provisional application No. 60/671,508, filed on Apr. 15, 2005, provisional application No. 60/671,517, filed on Apr. 15, 2005, provisional application No. 60/671,520, filed on Apr. 15, 2005.

(51) Int. Cl.
*H04B 1/66* (2006.01)
*H04N 7/12* (2006.01)
*G06K 9/00* (2006.01)
*G06K 9/46* (2006.01)

(52) U.S. Cl. .................. 375/240.19; 382/254

(58) Field of Classification Search ............ 375/240.03, 375/240.18, 240.19, 240.2; 348/398; 382/252, 382/232; *H04B 1/66; H04N 7/12; G06L 9/00, G06L 9/40, 9/46*
See application file for complete search history.

(56) References Cited

U.S. PATENT DOCUMENTS

| 5,598,215 | A  | * | 1/1997 | Watanabe ................ 348/416.1 |
| 6,934,420 | B1 | * | 8/2005 | Hsu et al. .................... 382/252 |
| 7,133,551 | B2 | * | 11/2006 | Chen et al. ................... 382/154 |
| 7,236,639 | B2 | * | 6/2007 | Jang ........................... 382/240 |

OTHER PUBLICATIONS

King, R., et al., "A Wavelet Based Algorithm for Pan Sharpening Landsat 7 Imagery," Proceedings of the International Geosciences and Remote Sensing Symposium, 2:849-581, (2001).
Nuñez, J., et al., "Multiresolution-Based Image Fusion with Additive Wavelet Decomposition," IEEE Transactions on Geosciences and Remote Sensing, 37(3):1204-1211, (1999).
Pohl, C., et al., "Multisensor Image Fusion in Remote Sensing: Concepts, Methods and Applications," Int. J. Remote Sensing, 19(5):823-854, (1998).

* cited by examiner

*Primary Examiner*—Tung Vo
(74) *Attorney, Agent, or Firm*—Lawrence Arthur Schemmel

(57) ABSTRACT

A method of enhancing a resolution of an image by fusing images includes applying a principal component analysis to a multispectral image to obtain a plurality of principal components, and replacing a first component in the plurality of principal components by a panchromatic image. The method further includes resampling remaining principal components to a resolution of the panchromatic image, and applying an inverse principal analysis to the panchromatic image and the remaining principal components to obtain a fused image of the panchromatic image and the multispectral image.

2 Claims, 26 Drawing Sheets

| | Real World Co-ordinates | | Image World Co-ordinates | |
|---|---|---|---|---|
| | X | Y | X | Y |
| p1: | 111.10 | 110.10 | 105.10 | 105.70 |
| p2: | 202.00 | 120.20 | 205.00 | 121.20 |
| p3: | 190.20 | 350.20 | 111.20 | 301.20 |
| p4: | 401.20 | 510.20 | 402.00 | 510.20 |
| p5: | 601.20 | 719.20 | 604.20 | 723.20 |
| p6: | 761.00 | 812.00 | 762.00 | 814.00 |
| p7: | 409.00 | 512.00 | 412.00 | 510.90 |
| p8: | 112.20 | 222.00 | 114.20 | 224.60 |
| p9: | 199.90 | 309.10 | 200.90 | 309.60 |
| p10: | 298.20 | 312.20 | 299.20 | 314.20 |
| p11: | 309.20 | 509.10 | 310.20 | 510.10 |
| p12: | 559.30 | 607.20 | 500.30 | 588.20 |
| p13: | 609.30 | 521.20 | 610.30 | 523.20 |
| p14: | 709.20 | 212.30 | 710.20 | 213.30 |
| p15: | 309.20 | 511.10 | 310.20 | 512.10 |

RMSEx: 25.556

RMSEy: 137151

$\dfrac{RMSEmin}{RMSEmax} =$ 0.53667

RMSEx EQUAL RMSEy

CE90 | Load Data | Tools | About

FIG.21

REMOTE SENSING IMAGERY ACCURACY ANALYSIS METHOD AND APPARATUS

CROSS-REFERENCE TO RELATED APPLICATIONS

The present application claims priority to provisional applications Ser. Nos. 60/671,508, 60/671,517 and 60/671,520, all filed on Apr. 15, 2005, the entire contents of each are incorporated herein by reference.

STATEMENT AS TO RIGHTS TO INVENTIONS MADE UNDER FEDERALLY SPONSORED RESEARCH AND DEVELOPMENT

This invention was made with Government support under SBAHQ-03-1-0023 awarded by the U.S. Small Business Administration. The government has certain rights in the invention.

FIELD OF THE INVENTION

The present invention relates generally to image sensing and image treatment methods and systems and more particularly to image accuracy analysis.

BRIEF SUMMARY OF THE INVENTION

An aspect of the present invention is to provide a method of enhancing a resolution of an image by fusing images. The method includes applying a principal component analysis to a multispectral image to obtain a plurality of principal components, and replacing a first component in the plurality of principal components by a panchromatic image. The method further includes resampling remaining principal components to a resolution of the panchromatic image, and applying an inverse principal analysis to the panchromatic image and the remaining principal components to obtain a fused image of the panchromatic image and the multispectral image.

Another aspect of the present invention is to provide a method of pansharpening an image by fusing images. The method includes applying a wavelet-based pansharpening to a plurality of bands in a multispectral image and a panchromatic image to obtain a pansharpened image, and computing quality metrics on the pansharpened image.

A further aspect of the present invention is to provide a method of compressing and decompressing an image. The method includes preprocessing an image, applying a discrete wavelet transform on the preprocessed image to decompose the preprocessed image into a plurality of sub-bands, and applying a quantization to each sub-band in the plurality of sub-bands. The method further includes partitioning the plurality of sub-bands into a plurality of code-blocks, encoding each code-block in the plurality of code-blocks independently to obtain a code-blocks stream, applying a rate control process to the code-blocks stream to obtain a bit-stream; and organizing the bit-stream to obtain a compressed image. The method may further include transforming the compressed image using embedded block decoding to obtain embedded decoded block data, re-composing the embedded decoded block data using an inverse discrete wavelet decomposion process, performing a dequantization by assigning a single quantum value to a range of values to obtain a dequantized data, and performing a decoding process on the dequantized data to substantially reconstruct the image.

Another aspect of the present invention is to provide a method of inserting geolocation into a JP2 file. The method includes inputting a GeoTIFF image file, extracting a GeoTIFF header that contains references to geographic metadata, creating a degenerated GeoTIFF image using the extracted geographic metadata, performing a geographic markup language (GML) conversion, inserting the degenerated GeoTIFF image into a universally unique identifier (UUID) box of the JP2 file, inserting the geographic markup language into an extandible markup language (XML) box of the JP2 file, and compressing the JP2 file using JP2000 image compression to obtain a GeoJPEG2000 image file.

Yet another aspect of the present invention is to provide a method for analyzing and estimating horizontal accuracy in imaging systems. The method includes inputting image locations and true locations in x and y directions, calculating a root mean square error in both x and y directions, and computing a horizontal accuracy by using the root mean square error in the x and y directions.

BRIEF DESCRIPTION OF THE DRAWINGS

FIG. 21 depicts a data list window allowing a user to select data points by highlighting them on the window;

DESCRIPTION OF EMBODIMENTS OF THE INVENTION

Figure 1:
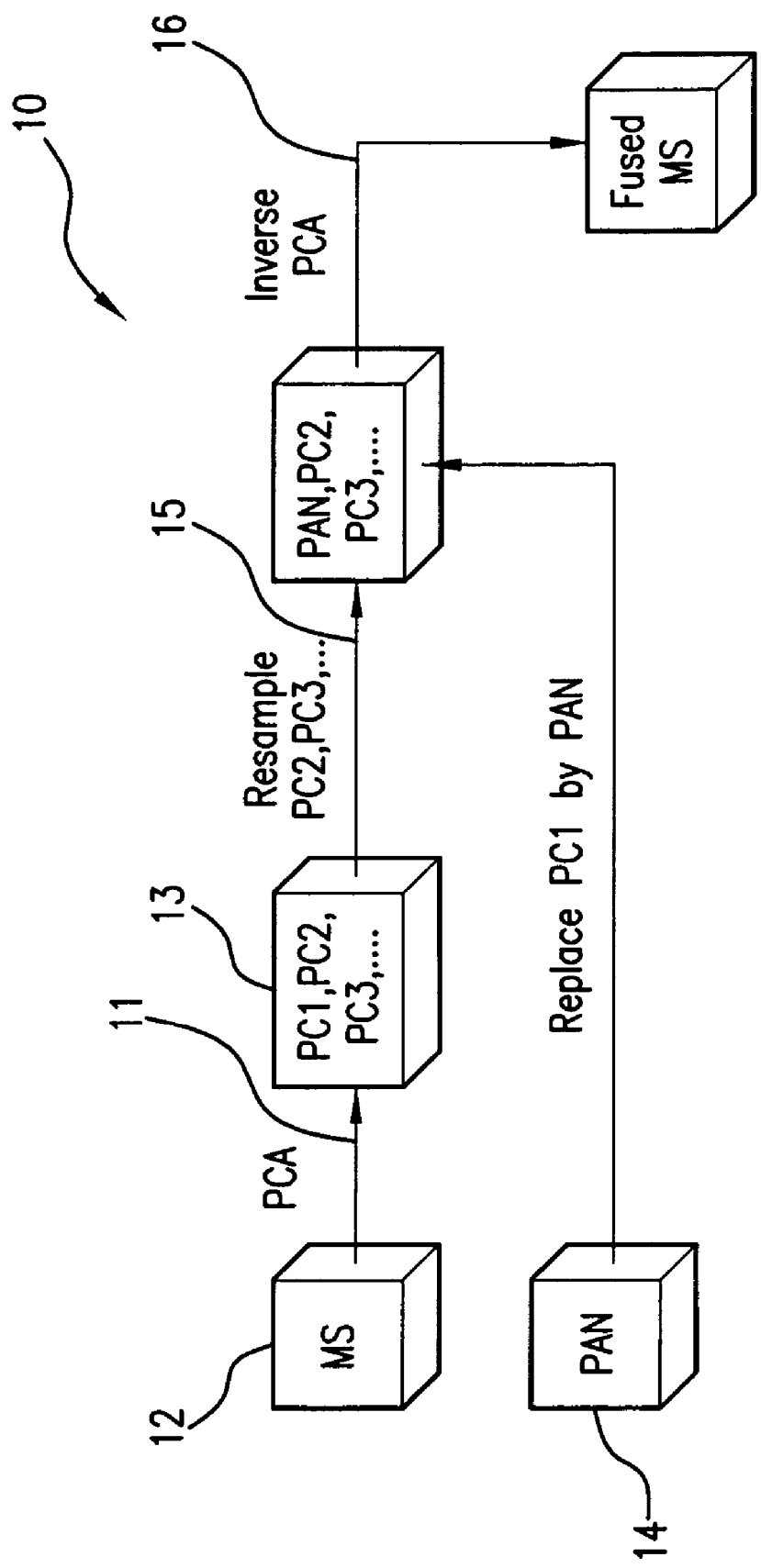
FIG. 1 shows a flow diagram of the principal component analysis method for fusing a multispectral and a panchromatic image, according to an embodiment of the present invention.

Image quality assessment can play a role in many imaging applications, including in remote sensing applications, where both spatial and spectral variations characterization may be needed. An example of use of image quality metrics is to quantitatively measure a quality of an image that correlates with perceived quality. Image quality metrics can also be used to benchmark different image processing algorithms by comparing objective metrics. Assessment measures can be divided into subjective and objective groups. Subjective measures are obtained according to rating by human observers, where judgment of different viewers may differ. Due to this and many other inherent drawbacks associated with subjective measures, quantitative or objective measures are used. A reliable image quality metric would provide a consistent, accurate and monotonic prediction of a quality of an image.

For example, in remote sensing, multispectral (MS) images are widely used for land cover classification, change detection and many other applications. In many applications, a number of preprocessing steps may be used prior to applying any classification or segmentation algorithm. The preprocessing steps may include resampling, atmospheric correction, sharpening, filtering, etc. In many applications, the effects of the preprocessing can degrade the performance of the segmentation or classification. Hence, assessing a quality of the image may be needed after any such preprocessing step.

Many metrics can be used to evaluate the quality of an image. In an embodiment of the invention, mean square error (MSE) is used to evaluate the quality of an image. MSE refers to the average of sum of squares of the error between two images. The MSE is defined as follows:

$$\sigma^2_{ms} E[|u(m,n)-v(m,n)|^2] \quad (1)$$

where u(m, n) and v(m, n) are two images of size m×n and E denotes the mathematical expectation.

An approximation of the MSE can also be used. The average least square error metric, which computed as shown in equation (2), is used as an approximate to MSE.

$$\sigma^2_{ls} = \frac{1}{MN} \sum_{m=1}^{M} \sum_{n=1}^{N} |u(m,n) - v(m,n)|^2 \quad (2)$$

The MSE quantifies the amount of difference in the energy of signals. Even though, the mean square error metric may have some limitation when used as a global measure of an image quality, when used as a local measure it can be effective in predicting the image quality accurately.

Another metric that may be used to evaluate the quality of an image is a root mean square (RMSE) which is related to MSE. Indeed, a root mean square error (RMSE) is the square root of the MSE. RMSE quantifies the average amount of distortion in each pixel in an image. MSE and RMSE give an account of the spectral fidelity of an image.

Another metric that may be used is the correlation function. The closeness between two images can be quantified in terms of correlation function. Correlation coefficients range from −1 to +1. A correlation coefficient value of +1 indicates that the two images are highly correlated, i.e., very close to one another. A correlation coefficient of −1 indicates that the two images are exactly opposite to each other. The correlation coefficient is computed as expressed in the following equation:

$$Corr(A/B) = \frac{\sum_{i=1}^{M} \sum_{j=1}^{N} (A_{i,j} - \overline{A})(B_{i,j} - \overline{B})}{\sqrt{\sum_{i=1}^{M} \sum_{j=1}^{N} (A_{i,j} - \overline{A})^2 \sum_{i=1}^{M} \sum_{j=1}^{N} (B_{i,j} - \overline{B})^2}} \quad (3)$$

where A and B are the two images between which the correlation is computed. Correlation Coefficients between each band of the multispectral image before and after a processing step quantify the spectral quality of the image after processing.

A further metric that may be used is the mean value of the pixels in a band. The mean value of pixels in a band of an image is the central value of the distribution of the pixels in that band of the image. A relative shift in the mean value (RM) quantifies the changes in the histogram of the image that may be the result of processing the image. The changes in the standard deviation of the distribution can also be considered in addition to the shift in mean. The relative shift in the mean value can be expressed mathematically as follows.

$$RM = \frac{Outputmean - OriginalMean}{Originalmean} \% \quad (4)$$

Another metric that may be of interest for the evaluation of a quality of an image is the Entropy. The Entropy is defined as the amount of information contained in a signal. The entropy of an image can be evaluated as shown in the following equation.

$$H = -\sum_{i=1}^{d} p(d_i) \log_2(p(d_i)) \quad (5)$$

where d is the number of gray levels possible and $p(d_i)$ is the probability of occurrence of a particular gray level $d_i$ in the image.

Yet another metric that can be used is the image noise index (INI). The image noise index (INI) is based on entropy. An image may undergo processing to obtain a processed image. The image may also be reconstructed from the processed image. Hence, a reconstructed image is obtained by going through the reverse process to get the estimate of the original multispectral image from the processed image. Entropy may be defined for each of the images prior to processing (entropy of the original image is x), after processing (the entropy of the processed image is y) and after reconstruction from the processed image (the entropy of the reconstructed image is z).

The value of (y−x) then gives the increased information content of the processed image. This increased information may be useful information, noise or both. The quantity |x−z| is the unwanted information or noise. Hence, the amount of useful information is the difference between these two values.

$$\text{Signal} = (y-x) - |x-z| \quad (6)$$

The image noise index (INI) is expressed as a ratio between the two values (y−x) and |x−z| minus 1.

$$INI = \frac{(y-x)}{|x-z|} - 1 \quad (7)$$

Therefore, it can be understood that a positive value of INI indicates an improvement in the information content and a negative value of INI indicates degradation of information in the processed image.

Another metric that may used is the normalized difference vegetation index (NDVI). NDVI can be used to quantify the strength of a vegetation area. NDVI can be defined as follows.

$$NDVI = \frac{NIR - R}{NIR + R} \quad (8)$$

where NIR is a near infrared band pixel value and R is a red band pixel value. The NDVI varies between +1 and −1. A value closer to +1 indicates dense vegetation. A NDVI value very close to zero represents water. NDVI is an important feature that is used in to distinguish between many classes. This metric quantifies the variations in the NDVI due to any preprocessing.

In an embodiment of the invention, image resampling is performed on an image as an example of process that can affect a quality of an image. The image resampling is applied on an image in order to study the effects of resampling on the image quality and to evaluate the image quality using various metrics.

Image resampling is a technique often used in remote sensing applications. Resampling techniques are used to estimate pixel values in between available samples. Many different resampling techniques such as nearest neighbor (NN), linear interpolation and cubic convolution can be used. One objective of resampling techniques is to minimize the residual difference between the actual and predicted pixel values.

In this resampling example, the spectral and spatial quality of nearest neighbor and cubic convolution method are compared. In the nearest neighbor method, the intermediate pixel values can be replicated from adjacent pixel values. This provides no spectral distortion but sharp edges of the image are distorted and spatial artifacts can be observed. The cubic convolution method tries to fit a polynomial of degree three and compute the intermediate pixel value. This method introduces some spectral distortion but the spatial quality of this method is better than nearest neighbor.

The correlation among the spectral bands can also be computed in the original and resampled multispectral image. In most application the spectral quality can be preserved after resampling. Hence, the correlation among the spectral bands for the resampled images and the original multispectral bands are expected to match.

In one example, co-registered subsets of Quickbird multispectral (MS) and panchromatic (PAN) image were considered. The original multispectral image is resampled to the resolution of the panchromatic image. TABLE 1 shows the values of the correlation coefficients computed. The nearest neighbor (NN) method has the same correlation as that of the original multispectral. This can be explained by the fact that the pixel values are not changed during the nearest neighbor (NN) resampling method. The Cubic convolution method introduces some spectral distortion.

TABLE 1

| Band Combinations | Correlation | | |
|---|---|---|---|
| | Original MS | NN | Cubic |
| Band 1&2 | 0.9752 | 0.9752 | 0.9772 |
| Band 1&3 | 0.9382 | 0.9382 | 0.9407 |
| Band 1&4 | 0.5477 | 0.5477 | 0.5505 |
| Band 2&3 | 0.9760 | 0.9760 | 0.9772 |
| Band 2&4 | 0.6373 | 0.6373 | 0.6390 |
| Band 3&4 | 0.6647 | 0.6647 | 0.6660 |

The Correlation between the panchromatic image (PAN) and the resampled multispectral bands is also computed. The cubic convolution technique provides higher correlation with the panchromatic image, which indicates that it has good spatial quality compared to the NN resampling technique. TABLE 2 indicates the correlation values computed.

TABLE 2

| Band Combinations | Correlation | |
|---|---|---|
| | NN | Cubic |
| Band 1&Pan | 0.5122 | 0.5229 |
| Band 2&Pan | 0.5293 | 0.5380 |
| Band 3&Pan | 0.5317 | 0.5381 |
| Band 4&Pan | 0.4808 | 0.4887 |

The relative shift in mean of each band is also computed. As expected the shift for NN resampling is found to be zero. The values computed are shown in TABLE 3.

TABLE 3

| Band | Relative Shift in Mean (%) | |
|---|---|---|
| | NN | Cubic |
| Band 1 | 0 | 0.0720 |
| Band 2 | 0 | 0.0982 |
| Band 3 | 0 | 0.1232 |
| Band 4 | 0 | 0.0284 |

Image fusion algorithms improve the low spatial resolution of the multispectral images using the spatial information from the corresponding panchromatic image. These image fusion algorithms can be used as a preprocessing step before feature extraction or classification is done on a multispectral image. Image fusion algorithms are also called pansharpening. Pansharpening combines information from a multispectral image and spatial information from a panchromatic image into a single fused image. The single image has both high spectral and spatial resolutions. The high spatial and spectral resolutions help to enhance features, provide detail information of targets or objects in the image and improve classification accuracy. Pansharpening algorithms include intensity-hue-saturation sharpening (HIS), principal component analysis (PCA) sharpening, Brovey sharpening, multiplicative sharpening and color normalized sharpening. Some of pansharpening algorithms are available in commercial remote sensing packages like ERDAS commercialized by Leica Geosystems and ENVI commercialized by Research Systems Incorporated.

In an embodiment of the invention, quality metrics are applied to an image fused using the principal component analysis (PCA) method.

Figure 2:
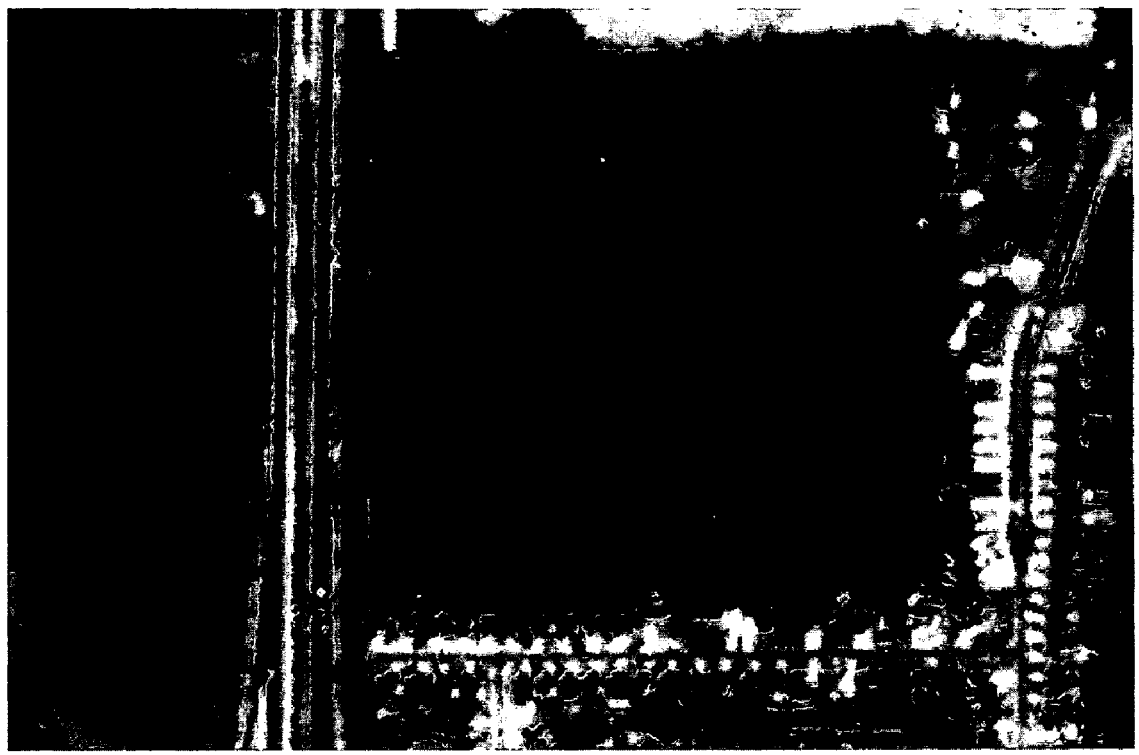
FIG. 2 shows the original multispectral image.
Figure 3:
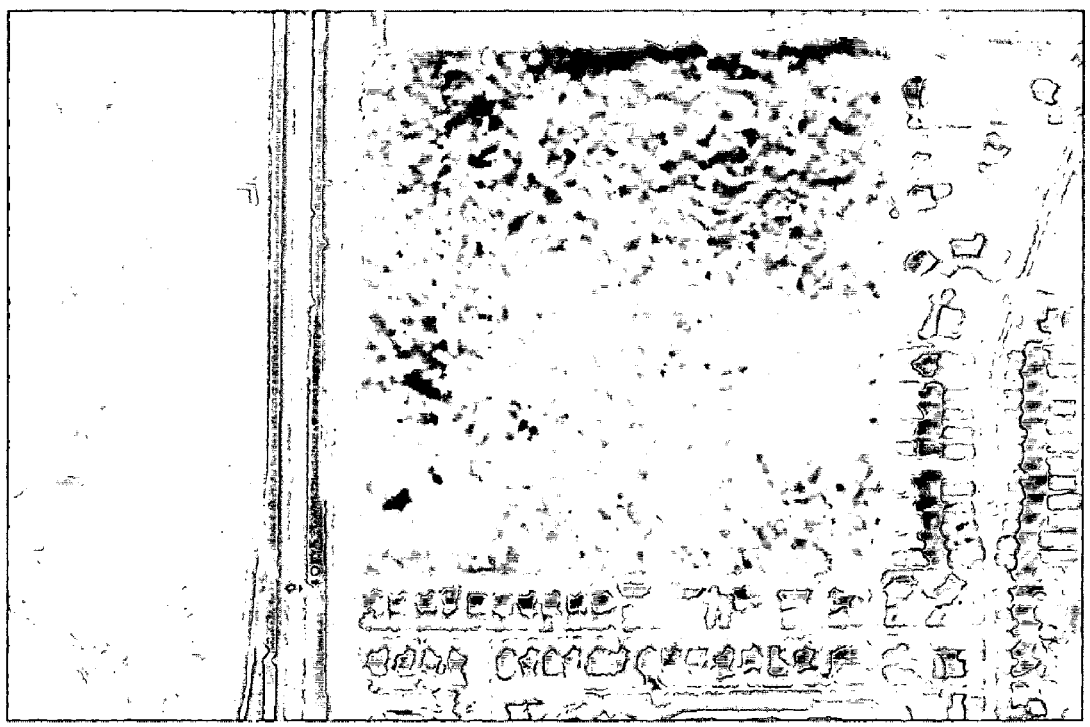
FIG. 3 shows the panchromatic image.
Figure 4:
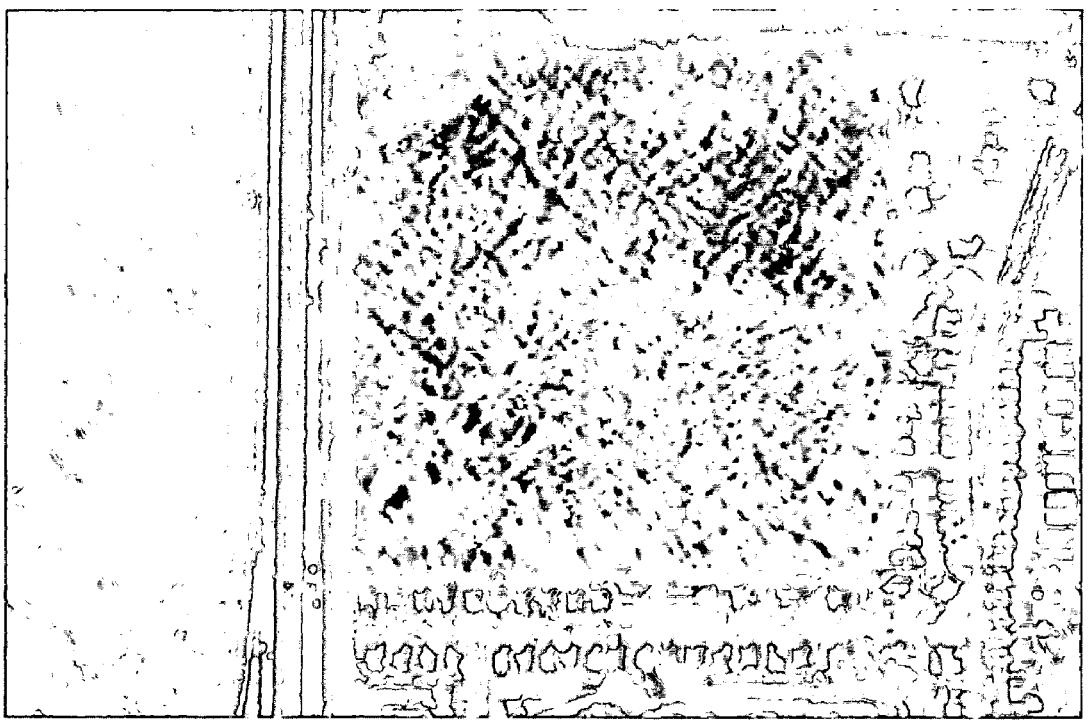
FIG. 4 shows the fused image resulting from the fusion process.
Figure 5A:
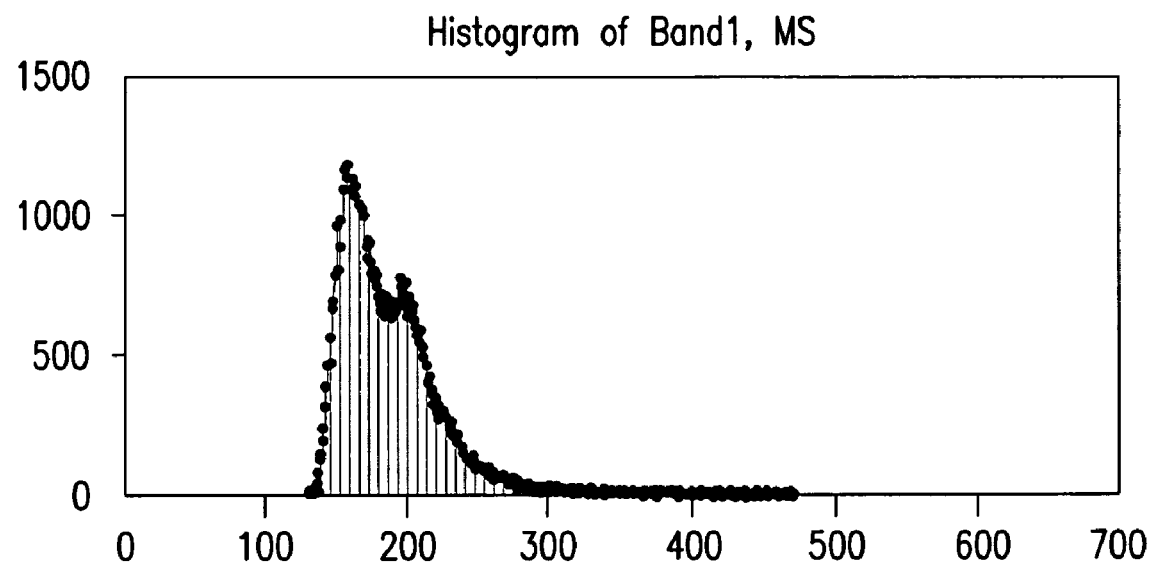
FIGS. 5A-5H show histograms of four bands in both multispectral and fused images.
Figure 5B:
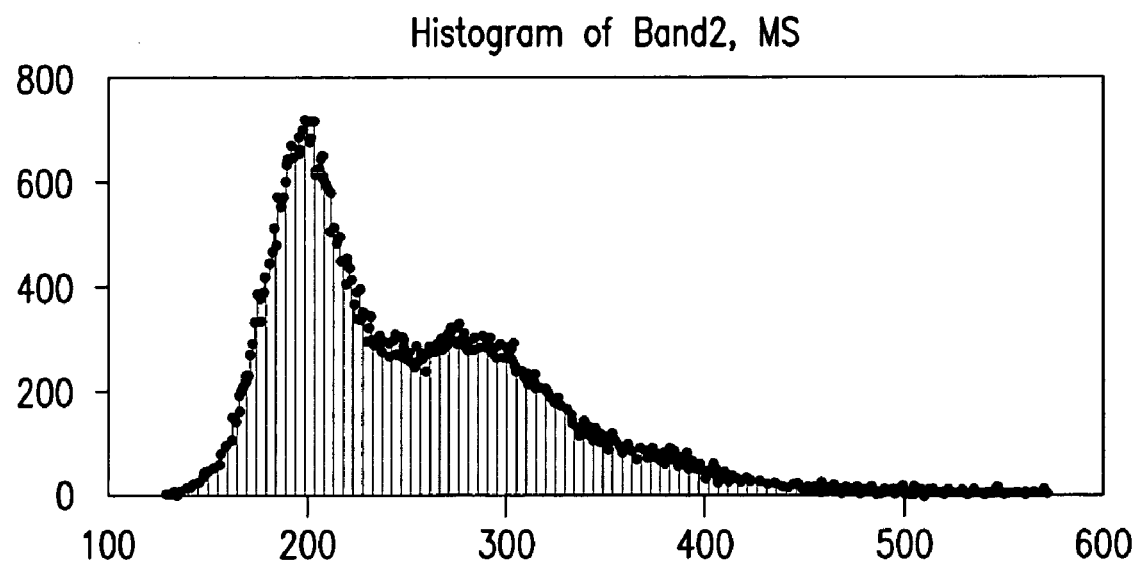
Figure 5C:
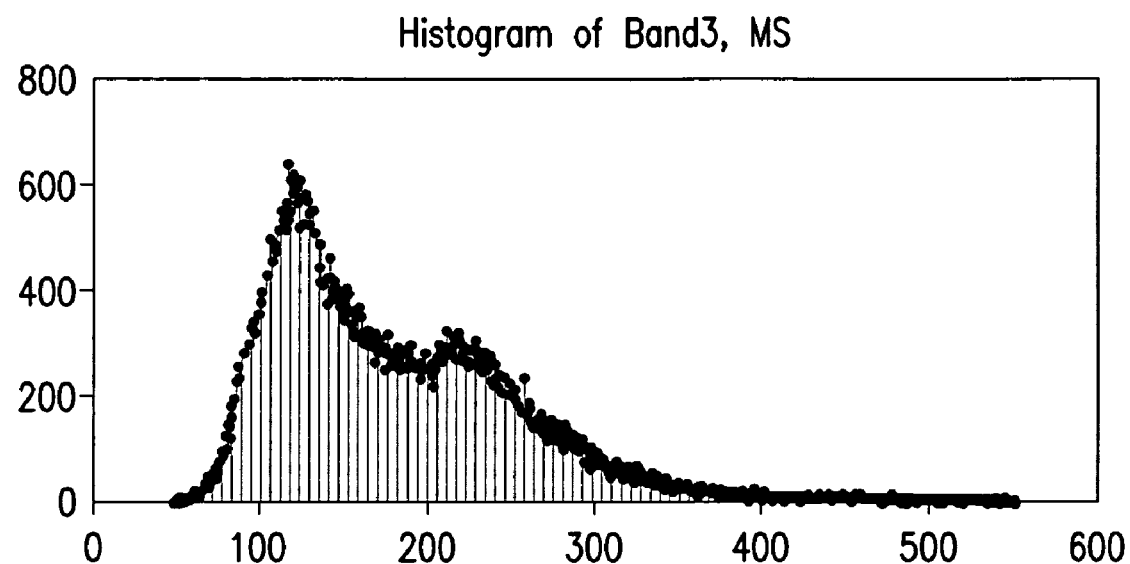
Figure 5D:
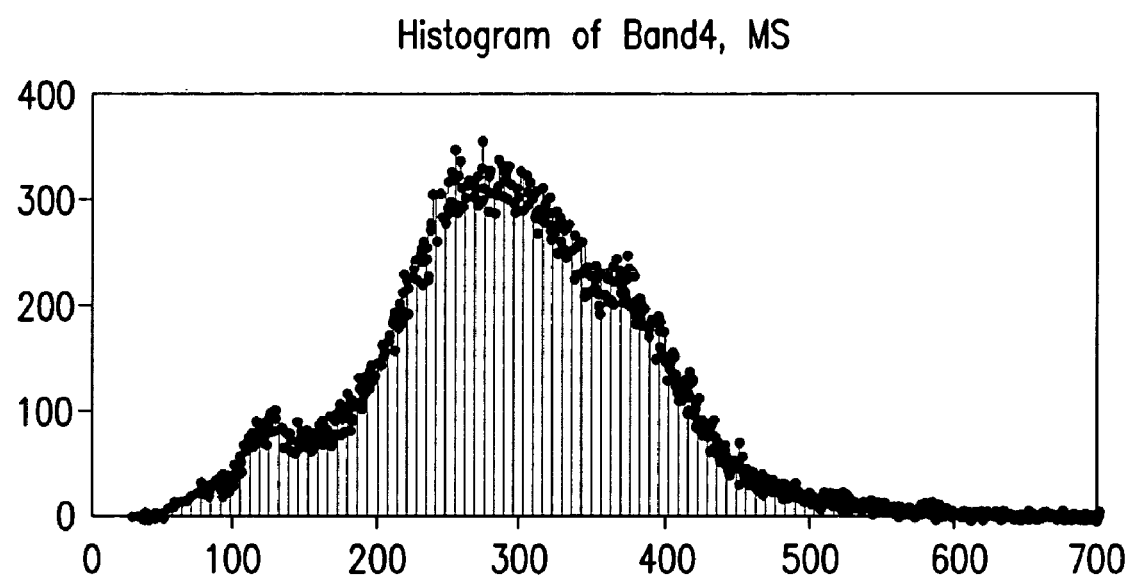
Figure 5E:
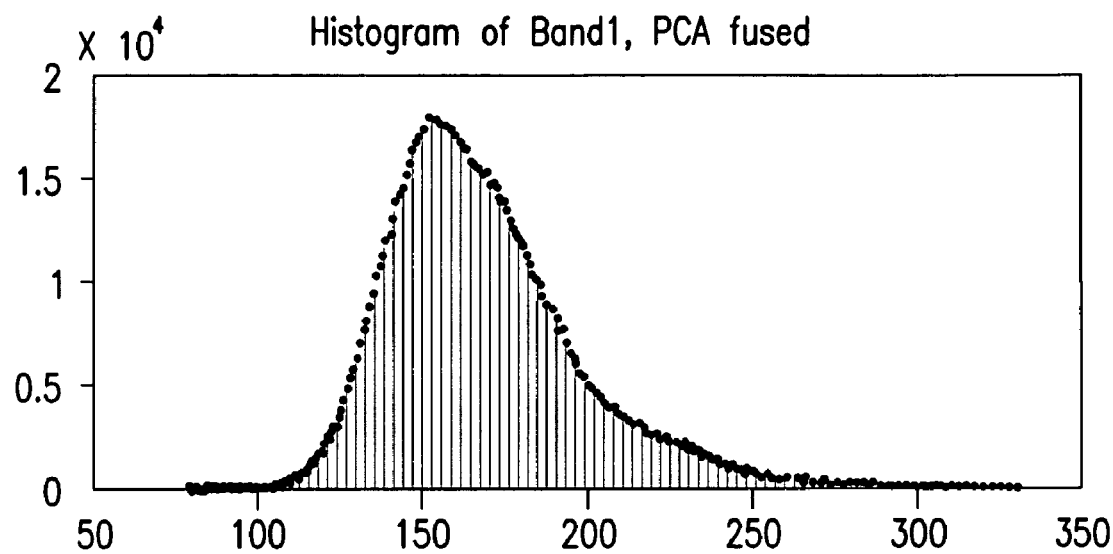
Figure 5F:
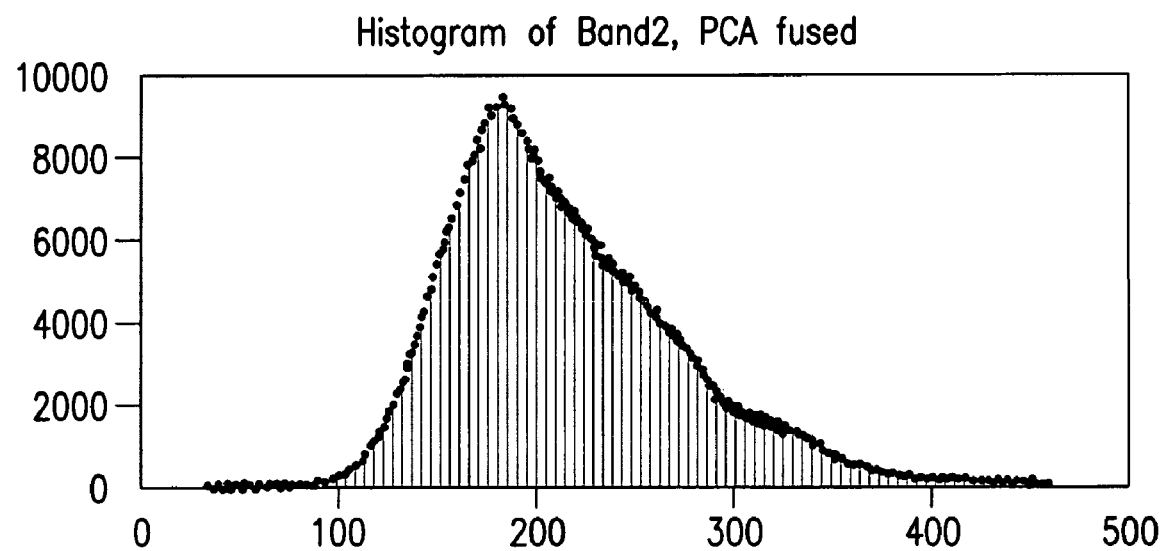
Figure 5G:
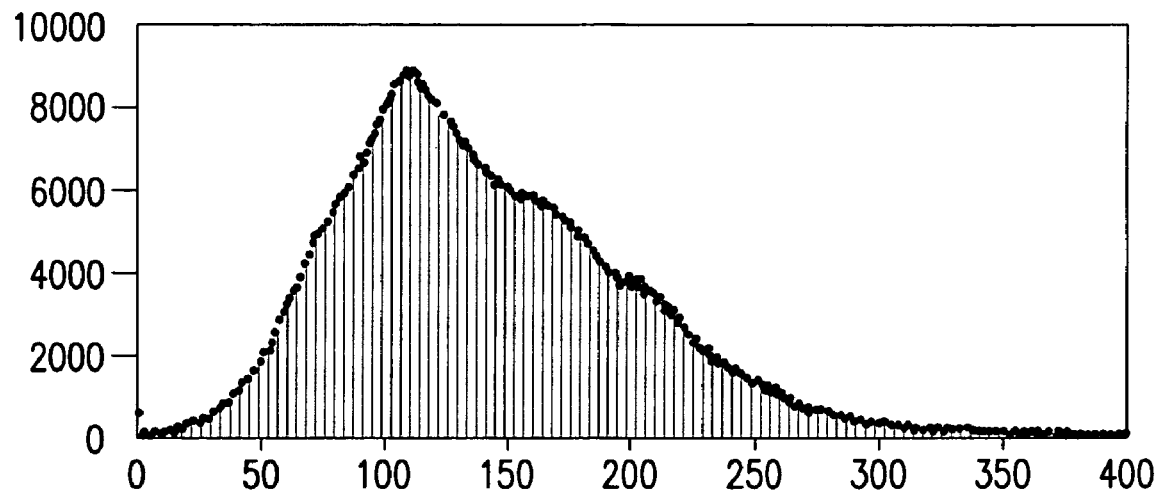
Figure 5H:
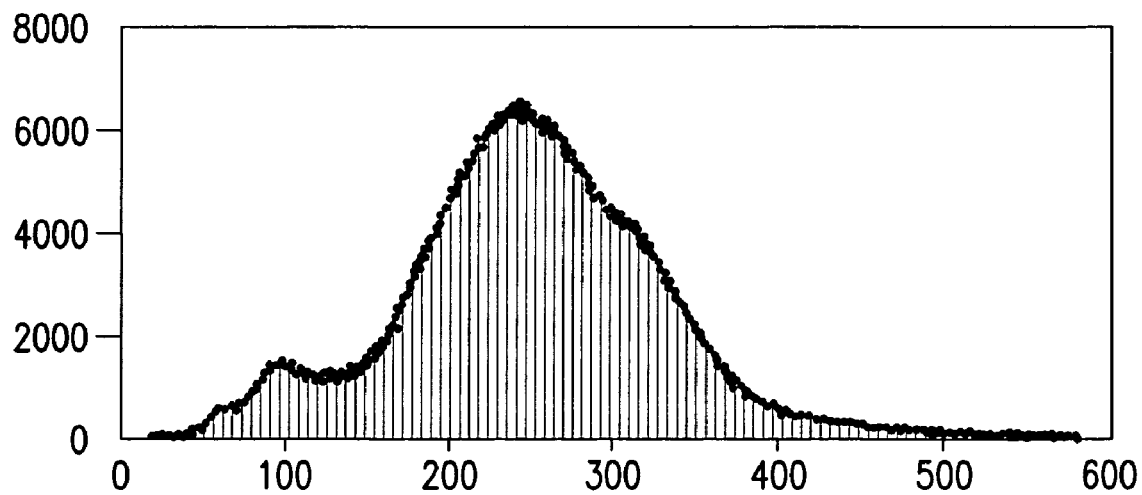

FIG. 1 shows a flow diagram of the principal component analysis (PCA) method for fusing the multispectral and panchromatic image, according to an embodiment of the present invention. In the flow diagram of principal component analysis method 10, PCA transform 11 can be applied to the original multispectral image MS 12. The PCA 11 transforms the image into a set of uncorrelated data PC1, PC2, PC2, etc., at 13. The first principal component PC1 has the maximum variance or most of the information. The first principal component PC1 is replaced by the panchromatic image PAN 14. The remaining principal components PC2, PC3, etc. are resampled to the panchromatic resolution, at 15, and the inverse PCA transform is applied to get back into image domain, at 16. Co-registered Quick bird multispectral MS and panchromatic PAN images were fused using this technique. The quality metrics were computed on the fused image. FIG. 2 shows the original multispectral MS image. FIG. 3 shows the panchromatic PAN image and FIG. 4 shows the result of the fusion process.

In an embodiment of the invention, the MSE and RMSE values are computed between each band of the fused and original multispectral image. The values are shown in TABLE 4.

TABLE 4

|  | MSE | RMSE |
|---|---|---|
| Band 1 | 887.9 | 29.797 |
| Band 2 | 4364.9 | 66.067 |
| Band 3 | 4541.3 | 67.389 |
| Band 4 | 6840.10 | 82.704 |

TABLE 4 shows that the DN values have changed a lot in band 4 due to sharpening. The DN values in other bands are also distorted a lot. However, the quality of the fused image cannot be based solely on this metric, i.e., solely based on MSE and/or RMSE, because some of the newly added information might be useful information.

In an embodiment of the invention, the correlation between different band combinations is computed to quantify the spectral and spatial quality of the image. TABLE 5 shows the value of the correlation coefficients computed between the four spectral bands. It is expected that the correlation for the fused bands should be as close as possible to that of the original multispectral bands to ensure preservation of spectral information. In addition, it is expected that the fusion process should not increase the correlation between the spectral bands.

The values in TABLE 5 indicate that there are variations in the spectral information of the fused image. Thus, the fused image does not improve the performance of spectral based classification. The correlation is also computed between each band of the original multispectral and panchromatic image. For this combination, the correlation of the fused image should be higher because the fused image has more spatial information compared to the panchromatic image.

TABLE 5

|  | Correlation | |
|---|---|---|
| Band Combinations | Original MS | Fused |
| Band 1&2 | 0.9752 | 0.9691 |
| Band 1&3 | 0.9382 | 0.9186 |
| Band 1&4 | 0.5477 | 0.3992 |
| Band 2&3 | 0.9760 | 0.9662 |
| Band 2&4 | 0.6373 | 0.4997 |
| Band 3&4 | 0.6647 | 0.5345 |

TABLE 6

|  | Correlation | |
|---|---|---|
| Band Combinations | Original MS | Fused |
| Band 1&Pan | 0.5122 | 0.8034 |
| Band 2&Pan | 0.5293 | 0.8675 |
| Band 3&Pan | 0.5317 | 0.8780 |
| Band 4&Pan | 0.4808 | 0.7842 |

In an embodiment of the invention, correlation values between each band of MS image and the pan image is computed for both the original MS image and the fused image. The correlation values are reported in TABLE 6. The correlation values indicate that the fused image has more useful spatial information compared the original multispectral MS image, as there is an increase in the corresponding values. The correlation values are better indicators of the spatial and spectral quality of the image.

In an embodiment of the invention, the relative shift mean (in %) for each band of the fused image is computed. The relative shift in mean of each band of the fused image helps to visualize the changes in the histogram. A positive shift in mean indicates the shift towards white and a negative shift indicates shift towards gray. The computed values are shown in the TABLE 7. The histogram of band 3 has shifted a lot compared to other bands. The histograms are also plotted to aid visual comparison. FIGS. 5A-5H shows the histograms of the four bands in both multispectral and PCA fused images. FIGS. 5A-5D show histograms of the four bands (band 1, band 2, band 3 and band 4, respectively) in the MS image and FIGS. 5E-5H show histograms of the four bands (band 1, band 2, band 3 and band 4, respectively) in the fused image.

TABLE 7

| Band | Relative Shift in Mean (%) |
|---|---|
| Band 1 | 8.74 |
| Band 2 | 14.19 |
| Band 3 | 20.53 |
| Band 4 | 14.96 |

In an embodiment of the invention, the image noise index (INI) is computed for each band of the fused image as shown in TABLE 8. The degradation of spectral information in all the bands is indicated by a negative INI value. The information loss or unwanted information is higher in band 4 compared to other bands.

TABLE 8

| Band | INI |
| --- | --- |
| Band 1 | −1.923 |
| Band 2 | −1.847 |
| Band 3 | −1.708 |
| Band 4 | −1.961 |

Figure 6:
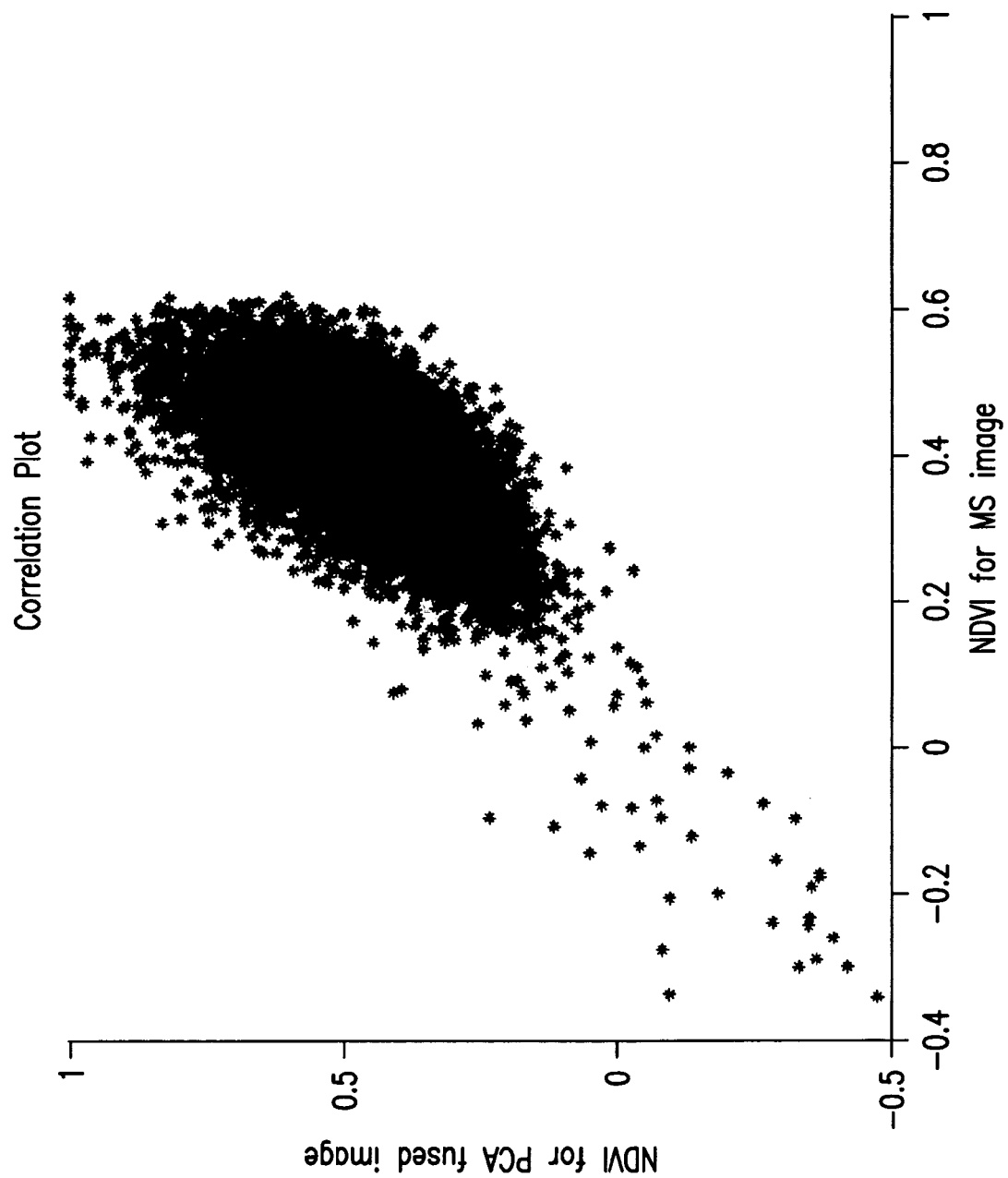
FIG. 6 shows a correlation plot of NDVI values for the fused image versus the NDVI values for the multispectral image.

In an embodiment of the invention, NDVI values are computed for a subset of vegetated area. FIG. 6 shows a correlation plot of the NDVI values for the fused image versus the NDVI values for the MS image. The correlation between the NDVI values of the multispectral and fused image is found equal to approximately 0.6696.

Therefore, from the above results, it can be seen that PAN dominates the spatial information which is shown from the high correlation of the fused bands with the panchromatic image. This is because the PAN replaces the first principal component, which contains most of the spectral information. In addition, the spectral information is lost compared to the multispectral image, which is reflected in MSE, RMSE, INI and relative shift in mean.

The quality of an image may not be predicted accurately by just considering only one of the metrics discussed above. In an embodiment of the invention, a combination of metrics (at least two) allows to evaluate the quality of the image with more precision. The combination of metrics selected can vary based on the type of preprocessing and the application of the image.

In another embodiment, a pansharpening and image quality interface (PSIQI) application incorporating a wavelet-based pansharpening is implemented. The PSIQI application is applied on images to sharpen images and/or compute quality metrics for sharpened data. Before inputting image data, i.e. multispectral image data and panchromatic image data, the image data is co-registered. A user is able to specify a location of the multispectral image and corresponding panchromatic image.

The PSIQI application performs a wavelet-based sharpening on the specified image data sets for sharpening. Image size and number of bits per pixel control the block size. Block processing can be used for efficient memory handling and for increasing the speed. Quality metrics chosen are then computed over the entire data set and stored in a file, for example a text file. The PSIQI application can be used in two modes of operation, sharpening and quality metric modes. The sharpening mode is used to sharpen the data using a wavelet-based method and compute the quality metrics. The quality metric mode is used only to compute metrics on data sharpened using other methods. A user may select a band to be sharpened. In addition, the application provides a tunable sharpening ways by allowing the user to select different mother wavelets, by enabling initial and final histogram matching steps and by enabling filtering using a selected filter such as a Wiener filter. While using the quality metrics mode, the tunable options are switched off and the user can only choose bands that exist in the sharpened data.

In an embodiment of the invention, PSIQI application is used to sharpen a co-registered IKONOS image set in the sharpening mode. In an embodiment of the invention, bands 1, 2 and 3 of the data are sharpened using the wavelet-based method and quality metrics, such as the mean square error (MSE), root mean square error (RMSE), correleation metrics, and relative shift in the mean are computed. In an embodiment of the invention, a bi-orthogonal 4.4 wavelet is used as the mother wavelet, for example. In an embodiment of the invention, initial and final histogram match are applied. In further embodiment of the invention, a Wiener filter is applied on the sharpened data to remove noise due to sharpening.

Figure 7A:
FIG. 7A shows a multispectral image data.
Figure 7B:
FIG. 7B shows a panchromatic image data.
Figure 7C:
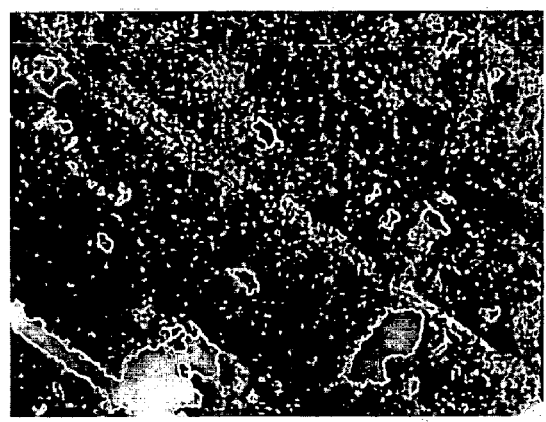
FIG. 7C shows a wavelet sharpened image.

FIG. 7A shows the multispectral image data. FIG. 7B shows the panchromatic image data. FIG. 7C shows the wavelet sharpened image. The mean square error (MSE), the root mean square error (RMSE), and relative shift in the mean of the histogram (RM) values are computed for each of the sharpened band and the values are shown in TABLE 9.

TABLE 9

| Band number | MSE | RMSE | RM (%) |
| --- | --- | --- | --- |
| Band 1 | 866.618955 | 29.438393 | 0.10 |
| Band 2 | 920.135026 | 30.333728 | 0.09 |
| Band 3 | 923.392627 | 30.387376 | 0.13 |

As shown in TABLE 9, the average change in the pixel value of band 3 is a slightly higher when compared with the other bands. In addition, the mean of band 3 is shifted by 0.13%.

The spectral quality of the sharpened image can be ascertained by comparing the correlation between each band in the image before and after sharpening. The correlation values computed are shown in TABLE 10. These correlation values indicate a slight variation in the spectral information in the sharpened data and an increase in spatial information.

TABLE 10

| Band Combinations | Correlation coefficient | |
| --- | --- | --- |
| | Original MS | Sharpened |
| Band 1&2 | 0.986744 | 0.974967 |
| Band 1&3 | 0.969066 | 0.954633 |
| Band 2&3 | 0.990432 | 0.990152 |
| Band 1&PAN | 0.740918 | 0.784106 |
| Band 2&PAN | 0.790111 | 0.840246 |
| Band 3&PAN | 0.784879 | 0.836089 |

As stated above image quality evaluation methods are used on image data. The image data can be provided in a large size. For example, the size of the multi-resolution Quickbird GeoTIFF image used in this study is 380 MB. Therefore, compression of the images may be needed for storing and transmitting to save storage space, bandwidth and to lower the transmission times. Image compression can be performed in either "lossy" or lossless fashion. Lossless compression may be desirable in critical situations where any loss in image data and quality may lead to erroneous analysis. However, in various other applications lossy compression may be preferred as it provides high compression ratio that results in smaller image sizes. However, the trade off with using lossy compression is that as the compression ratio increases, increased spatial and spectral features of the image can be lost. Hence, it may be worthwhile to analyze the impact of image compression on image quality.

In an embodiment of the invention, an encoding and decoding process JPEG2000 product is used to compresses and decompresses images using wavelet transformation opposed to its predecessor JPEG that uses discrete cosine transformation (DCT). Wavelet transform-based image compression algorithms allow images to be retained without much distortion or loss when compared to JPEG, and hence are recognized as a superior method. The JPEG2000 encoding and decoding process includes a JPEG2000 encoding process and a JPEG2000 decoding process. The encoding and decoding process are divided into several stages as can be seen from the FIGS. 8 and 9.

Many format for the images can be used including TIFF (Tagged Image File Format) which is used to store and transfer digital satellite imagery, scanned aerial photos, elevation models, scanned maps or the results of many types of geographic analysis. TIFF is the only full-featured raster file format in the public domain, capable of supporting compression, tiling, and extension to include geographic metadata. The main strengths of TIFF are a highly flexible and platform-independent format that is supported by numerous image-processing applications. Another image format is the Geo-TIFF format. A GeoTIFF file is a TIFF 6.0 file, and inherits the file structure as described in the corresponding portion of the TIFF specifications. GeoTIFF uses a small set of reserved TIFF tags to store a broad range of georeferencing information, catering to geographic as well as projected coordinate systems needs. The geographic data can then be used to position the image in the correct location and geometry on the screen of a geographic information display.

Figure 8:
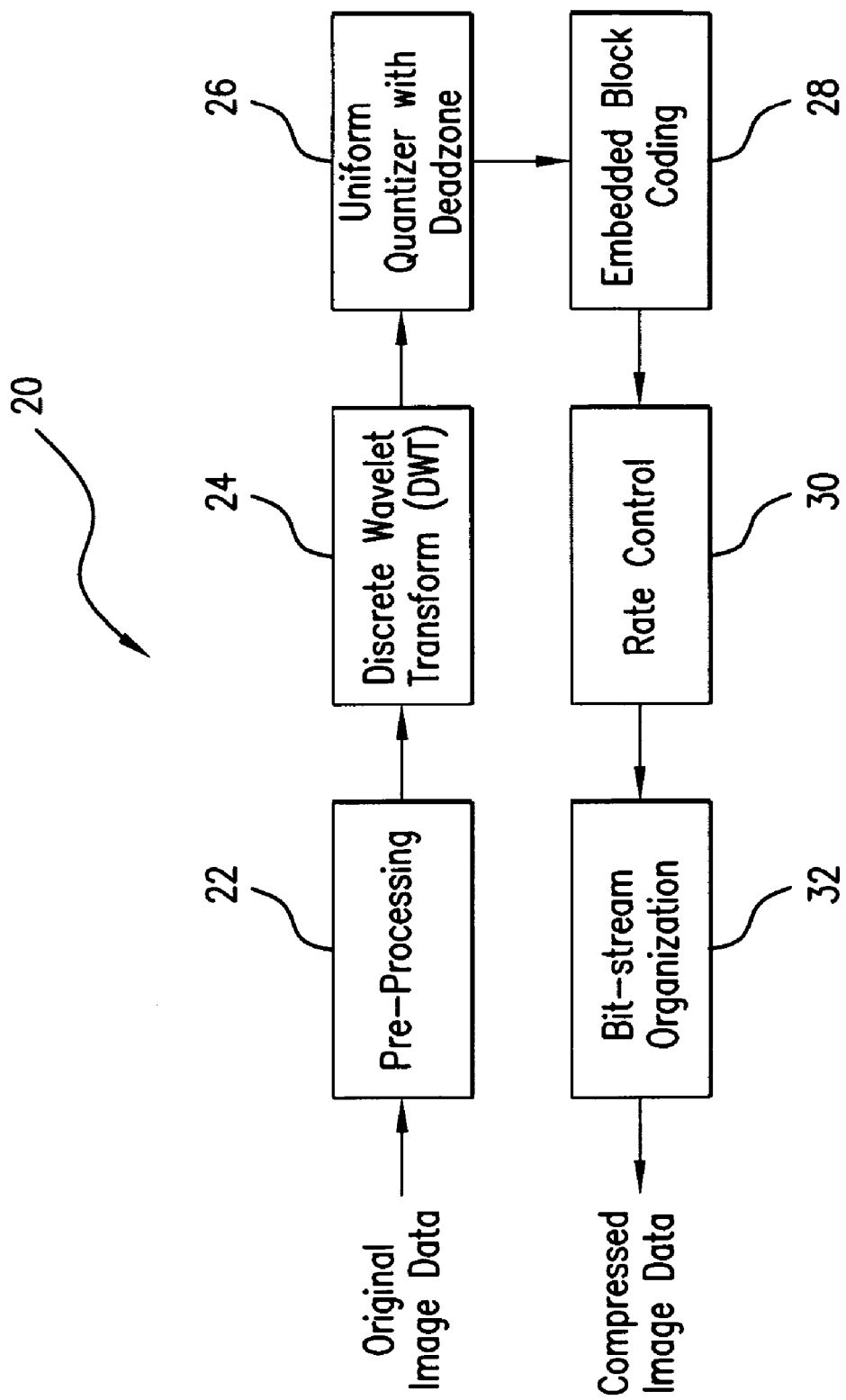
FIG. 8 shows a flow diagram of the JPEG2000 encoding process, according to an embodiment of the invention.

FIG. 8 shows a flow diagram of the JPEG2000 encoding process, according to an embodiment of the invention. The JPEG2000 encoding process 20 includes pre-processing 22 which is the first stage of encoding followed by a discrete wavelet decomposition (DWT) 24. DWT 24 is used to decompose each image tile into its high and low sub bands and filter each row and column of the pre-processed image tile with a high-pass and a low-pass filter. In an embodiment of the invention, multiple levels of the DWT 24 can be performed and the number of stages performed is implementation dependent. In an embodiment of the invention, for each sub-band, a basic quantization is done using a quantizer, at 26. Quantization is defined as achieving compression by assigning a range of values to a single quantum value. The sub-bands of each tile are further partitioned into relatively small code-blocks (for example, 64×64 samples, 32×32 samples, etc.) such that code blocks from a sub-band have the same size and then each code-block is encoded independently to obtain a code block stream, at 28. After block coding, a rate control process is applied the code block stream, at 30. Rate control is a process by which the code stream is altered to a bit stream so that a target bit rate can be reached. The bit stream is then organized, at 32 and a compressed image data is obtained.

Figure 9:
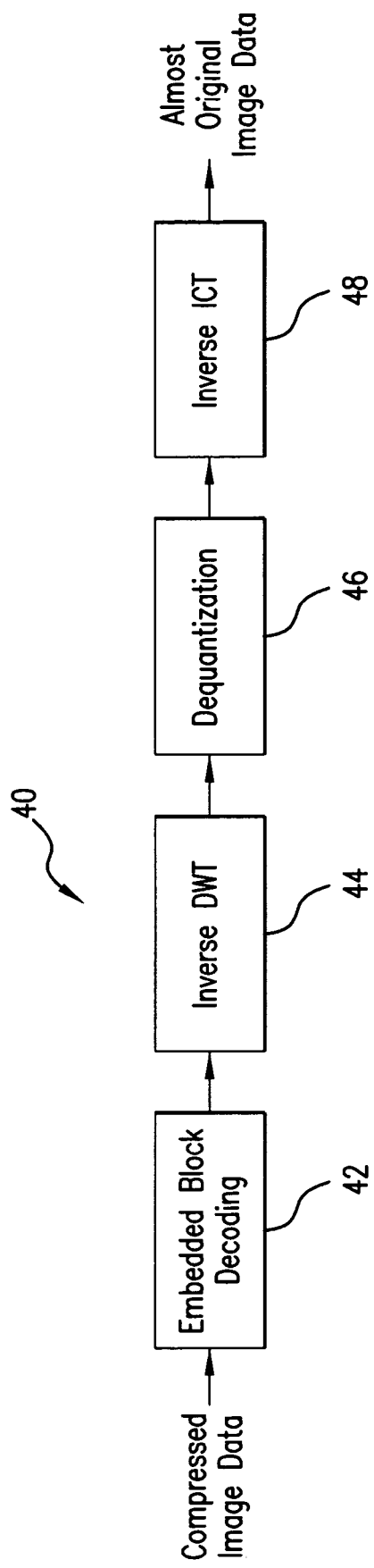
FIG. 9 shows a flow diagram of the JPEG2000 decoding process, according to an embodiment of the invention.

FIG. 9 shows a flow diagram of the JPEG2000 decoding process, according to an embodiment of the invention. The decoding process 40 is the opposite of the encoding process 20. The compressed data is transformed using embedded block decoding, at 42. The embedded decoded block data is then re-composed using an inverse discrete wavelet decomposition (inverse DWT) 44. A dequantization is then performed at 46. The dequantization, is the inverse of quantization. Thus dequantization is a decompression that allows assigning a single quantum value to a range of values. Following the dequantization at 46, an inverse ICT is performed at 48 in which is a decoding process to reconstruct substantially the original image data.

Figure 10:
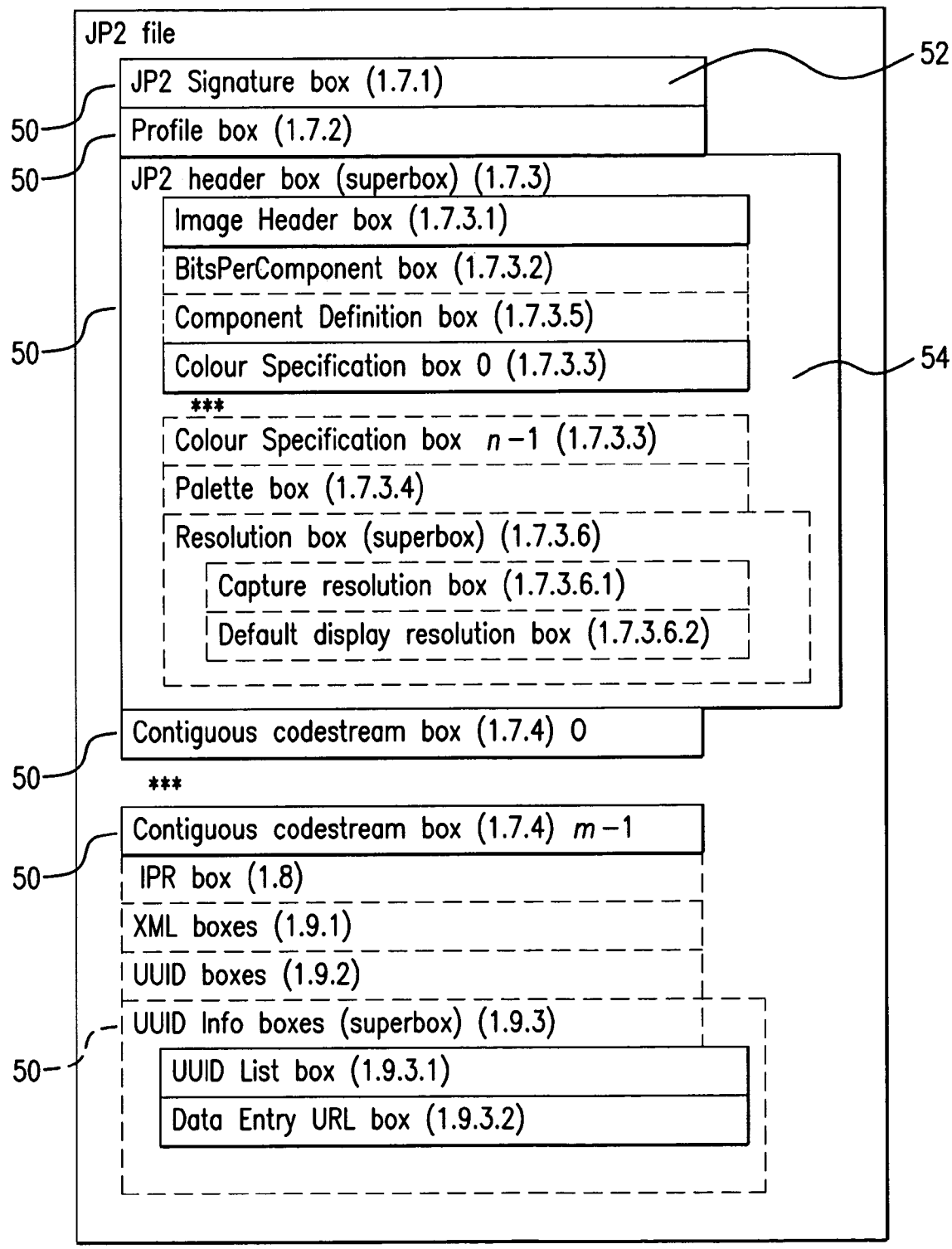
FIG. 10 shows a structure of a JP2 file, according to an embodiment of the invention.

FIG. 10 shows a structure of a JP2 file, according to an embodiment of the invention. The JP2 file structure can be considered as a collection of boxes 50. Some of the boxes 50 are independent, such as box 52, and some of the boxes, such as box 54, contain other boxes. The binary structure of a file is a contiguous sequence of boxes. The start of the first box is the first byte of the file, and the last byte of the last box is the last byte of the file.

There are two approaches for the implementation of geo-referencing data in JP2 files, which are inserting the data into either one of the two boxes. One approach is UUID (Universally Unique Identifiers) box, which provides a tool by which vendors can add additional data to a file without risking conflict with other vendors. Another approach is XML (eXtensible Markup Language) box that provides a tool for vendors to add XML formatted information to a JP2 file. Since a UUID box and a XML box can be used to add vendor specific information, two open standards can be used, each making use of either UUID box or XML box. For example in Geo-TIFF, a UUID box termed as GeoTIFF box contains a specified UUID and a degenerated GeoTIFF file. By degenerated, it means a valid GeoTIFF file excluding image information. A UUID represents a 128-bit unique value and the UUID for the box is static unsigned char geotiff_box={0xb1, 0x4b, 0xf8, 0xbd, 0x08, 0x3d, 0x4b, 0x43, 0xa5, 0xae, 0x8c, 0xd7, 0xd5, 0xa6, 0xce, 0x03}. The UUID box, i.e., the GeoTIFF box, contains a valid GeoTIFF file which contains the geo-referencing information about the file being compressed and a very simple image with the constraints: image height and width are both 1 pixel, datatype is 8-bit, color space is gray-scale, the (single) pixel must have a value of 0 for its (single) sample. The intent of containing the valid GeoTIFF file is that any compliant GeoTIFF reader or writer would be able to read or write the image.

Another file formatting that can be used in JP2 file is Geographic Markup Language (GML). GML is an XML based encoding standard for geographic information developed by the OpenGIS Consortium (OGC). In this approach, geo-location information coded in GML is stored in a non-proprietary way within JPEG2000 XML box. For example, the JPEG2000_GeoLocation in GML given below refers to a JP2 file with an EPSG code of 32610 (PCS_WGS84_UTM_zone_10N), origin 631333.108344E, 4279994.858126N, a cell size of X=4 and Y=4, and a rotation of 0.0.

```
<?xml version="1.0" encoding="UTF-8"?>
<JPEG2000_GeoLocation >
    <gml:RectifiedGrid xmlns:gml="http://www.opengis.net/gml"
    gml:id="
    JPEG2000_GeoLocation_1" dimension="2">
        <gml:origin>
        <gml:Point gml:id="JPEG2000_Origin"
        srsName="epsg:32610">
            <gml:coordinates>631333.108344,
            4279994.858126</gml:coordinates>
        </gml:Point>
        </gml:origin>
        <gml: offsetVector gml:id="p1">0.0,4.0,0.0</gml: offsetVector>
<gml: offsetVector gml:id="p2">4.0,0.0,0.0</gml: offsetVector>
</gml:RectifiedGrid>
</JPEG2000_GeoLocation>
```

A JPEG2000_GeoLocation XML Element containing a RectifiedGrid construct contains the geographic information. The RectifiedGrid includes an ID of "JPEG2000_GeoLocation_1" with a dimension equal to 2. The origin element is also included and is provided an id of "JPEG2000_Origin." The Point specifies the coordinate of the bottom-left corner of the bottom-left cell in the image. The srsName can be an immediate EPSG code. However, if an existing EPSG code is not available the srsName refers to a full SpatialReferenceSystem element definition within a same JP2 XML box. A pair of offsetVector elements define vertical and horizontal cell "step" vectors, and may include a rotation. A conformant reader is usually set to ignore all other elements within the JPEG2000_GeoLocation element.

Figure 11:
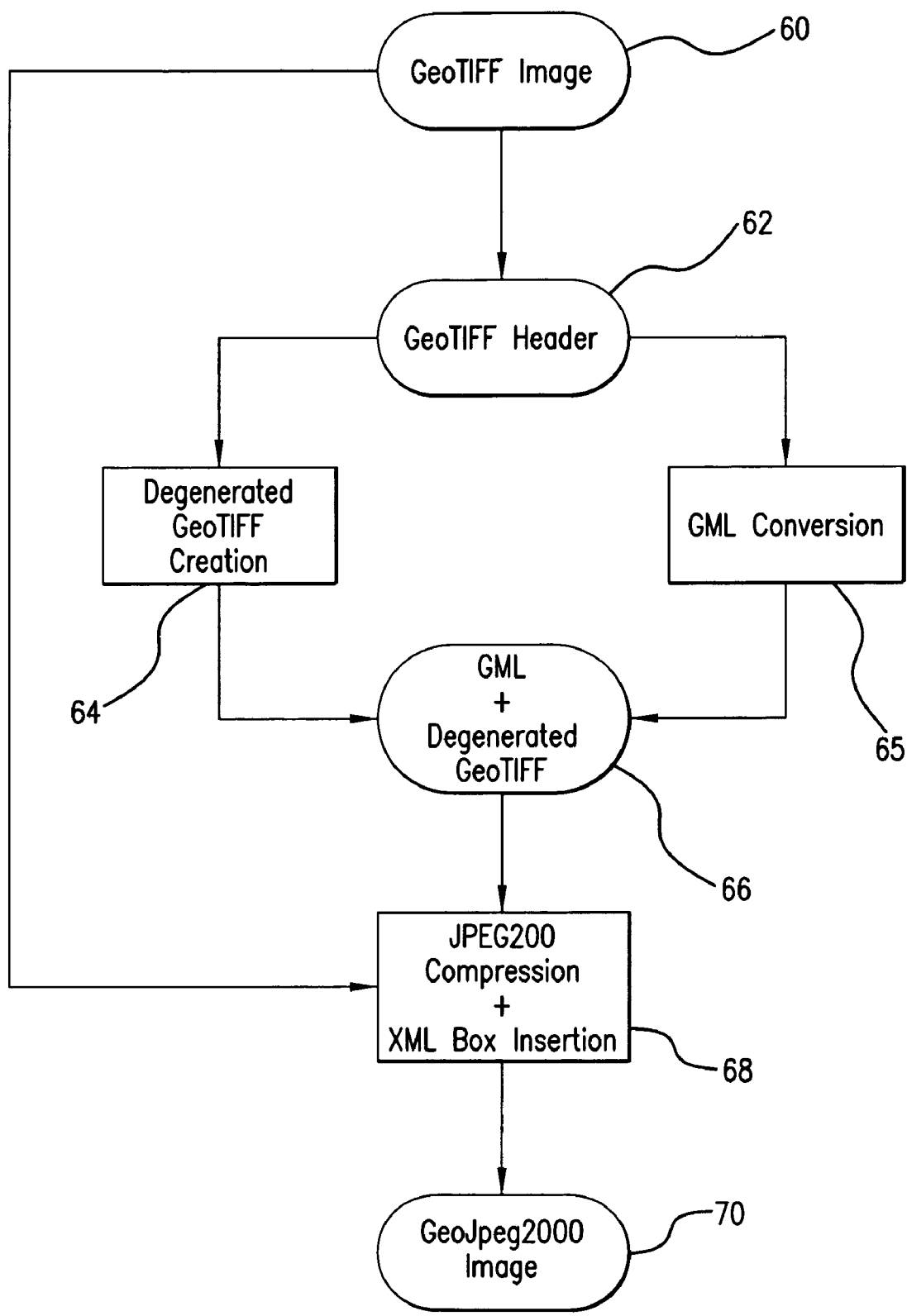
FIG. 11 shows a process flow diagram for inserting geolocation in JP2000 images information, according to an embodiment of the present invention.

FIG. 11 shows a process flow diagram for inserting geolocation (e.g., geo-referencing metadata) in JP2000 images information, according to an embodiment of the present invention. A GeoTIFF image file or files is inputted at 60. First, a GeoTIFF header that contains the references to the geographic information is extracted from the GeoTIFF image files at 62. Then, a degenerated GeoTIFF image is created using the extracted geographic metadata that follows restrictions imposed by the "GeoTIFF Box" specification, at 64. A GML conversion is performed at 65. The geographic metadata can also be used to extract the geographic information and create a XML string, at 66, compliant with the GML provided in the second standard. The degenerated GeoTIFF is inserted in the UUID box and the GML is inserted in the XML box during the image compression, at 68 such that the geolocation metadata is embedded in the JP2 image. A GeoJPEG2000 image is then obtained and output at 70.

In an embodiment of the invention, a toolkit for image compression and metadata insertion is developed using Java version J2SE 1.4.2. Object-oriented interfaces for manipulating different formats of images can be provided by various vendors. Examples of APIs that are used are Java advanced imaging (JAI), Java image I/O, LuraWave.jp2 Java and Geo-TIFF-JAI. JAI is a cross-platform, flexible, extensible toolkit for adding advanced image processing capabilities to applications for the Java platform. Java Image I/O API provides a pluggable architecture for working with images stored in files It offers substantially more flexibility and power than the previously available APIs for loading and saving images. LuraWave.jp2 JAVA/JNI-SDK for Windows (demo version) is a part of the LuraWave.jp2 image compression software family and is based on Algo Vision LuraTech's implementation of the JPEG2000 image compression standard and is fully compliant with the Part 1 of the JPEG2000 International Standard. GeoTIFF-JAI is a "geotiff" extension to the Java Advanced Imaging component and is an opens source interface developed by Niles Ritter In an embodiment of the invention, Front-end and the codes to compute image quality metrics are developed using Matlab 6.5.1, release 13. Matlab provides a java interface to access classes written in Java and call the object's methods.

Image quality metrics are figures of merit used for the evaluation of imaging systems or processes. The image quality metrics can be broadly classified into two categories, subjective and objective. In objective measures of image quality metrics, some statistical indices are calculated to indicate the reconstructed image quality. The image quality metrics provide some measure of closeness between two digital images by exploiting the differences in the statistical distribution of pixel values. Examples of error metrics used for comparing compression are Mean Square Error and Peak Signal to Noise Ratio (PSNR). The MSE, RMSE and correlation metrics are described in the above paragraphs.

Peak Signal to Noise Ratio (PSNR) measures the estimates of the quality of reconstructed image compared with an original image and is a standard way to measure image fidelity. A 'signal' is the original image and 'noise' is the error in a reconstructed image due to compression and decompression. PSNR is a single number that reflects the quality of reconstructed image and is measured in decibels (db).

$$PSNR = 20\log_{10}\left(\frac{S}{RMSE}\right) \quad (9)$$

where S is a maximum pixel value and RMSE is the Root Mean Square Error of the image. The actual value of PSNR is not meaningful but a comparison between two values between different reconstructed images gives one measure of quality. As seen from inverse relation between MSE and/or RMSE and PSNR, low value of MSE and/or RMSE translates to a higher value of PSNR. This implies that a higher value of PSNR is better.

In an embodiment of the invention, geo-referencing metadata is inserted into a JPEG2000 (jp2) file during compression, for example using the method illustrated in FIG. 11. A UUID box with specified UUID is created and a degenerated GeoTIFF is created and inserted into the data section of UUID box. A XML box of the JPEG2000 file is also filled with a minimal set of GML used for geo-location. Since the JPEG2000 created by the application meets both the standards, the geo-location information of the file should be compatible with most of the GIS application that support JP2 file format of JPEG2000.

Figure 12:
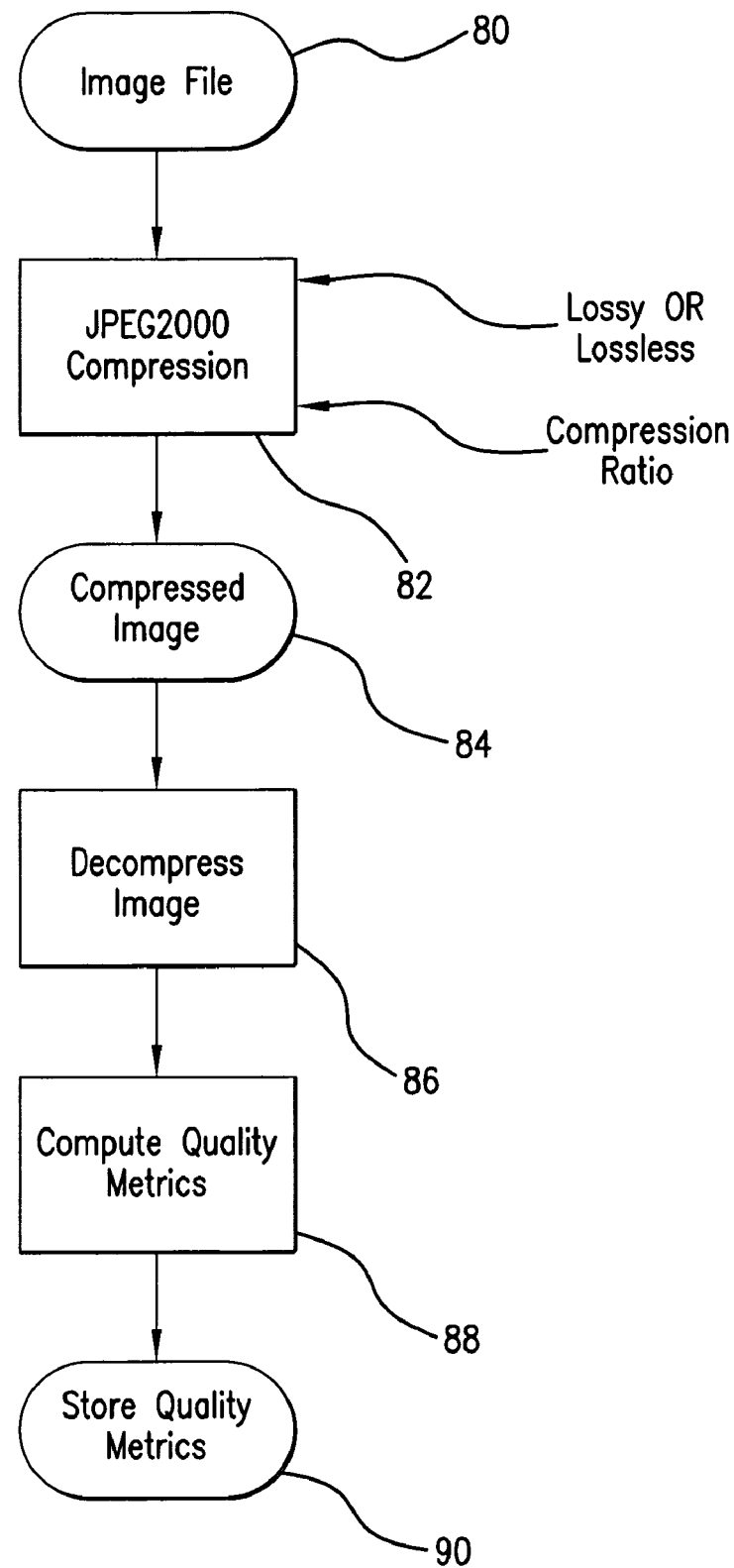
FIG. 12 shows a process flow diagram for compressing/decompressing an image and computing quality metrics, according to an embodiment of the present invention.

FIG. 12 shows a process flow diagram for compressing/decompressing an image and computing quality metrics, according to an embodiment of the present invention. An image file is inputted, at 80. A JPEG2000 compression is performed on the image file, at 82 to obtain a compressed image at 84. The compression at 82 is performed at certain compression ratio and the resultant compressed image at 84 may comprised lossy or lossless information. The compressed imaged at 84 is then decompressed to obtain a decompressed image at 86. Computer quality metrics are then computed to compare the original image at 80 and the decompressed image at 86. The obtained quality metrics obtained at 88 can be stored at 90.

In an embodiment of the invention, the reversible compressions were performed at different ratios on a test image and the JPEG2000 file is decompressed back to TIFF file format. The quality metrics were then calculated to compare the original and the reconstructed images. The test image is a 1024×1024 pixels subset of Quickbird multi-spectral image of Memphis, TN area. The image is compressed at various compression ratios and then decompressed using JPEG2000 method and the quality metrics of the reconstructed image is computed by using the original image as a benchmark.

Figure 13A:
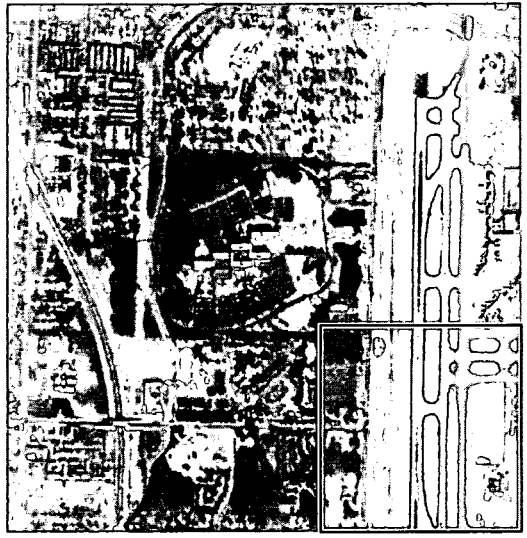
FIG. 13A depicts an original image.
Figure 13B:
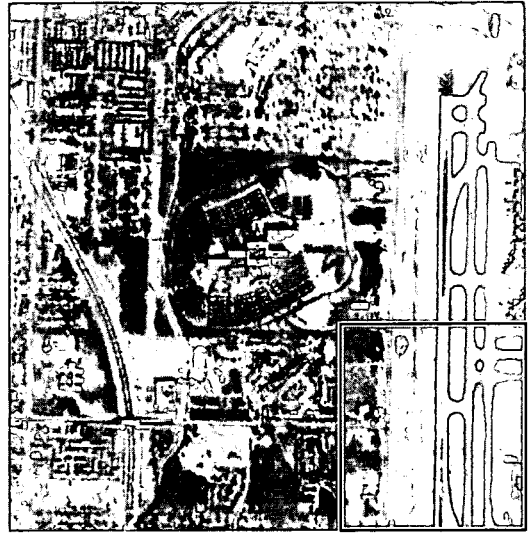
FIG. 13B-13I depict the original image compressed at various compression ratios.
Figure 13C:
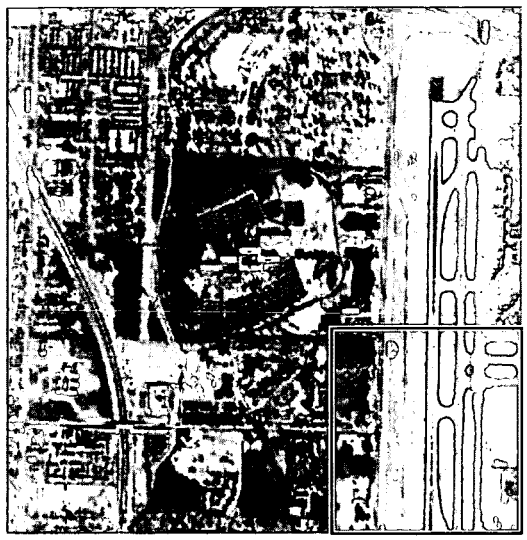
Figure 13D:
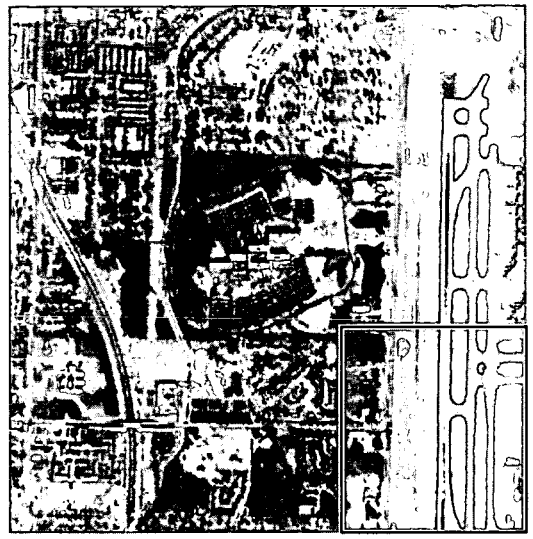
Figure 13E:
Figure 13F:
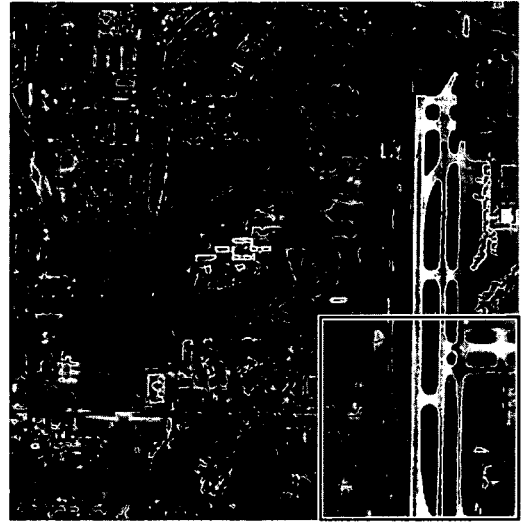
Figure 13G:
Figure 13H:
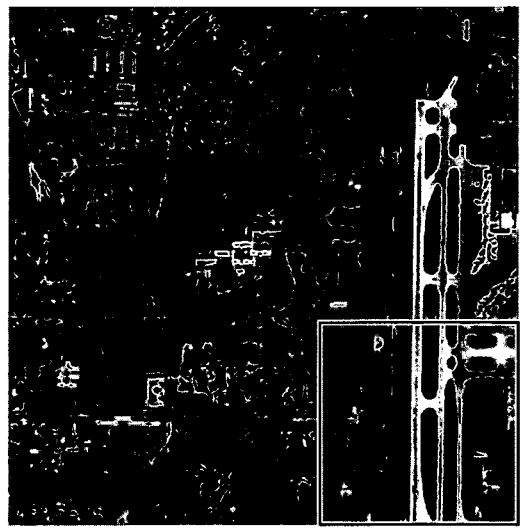
Figure 13I:
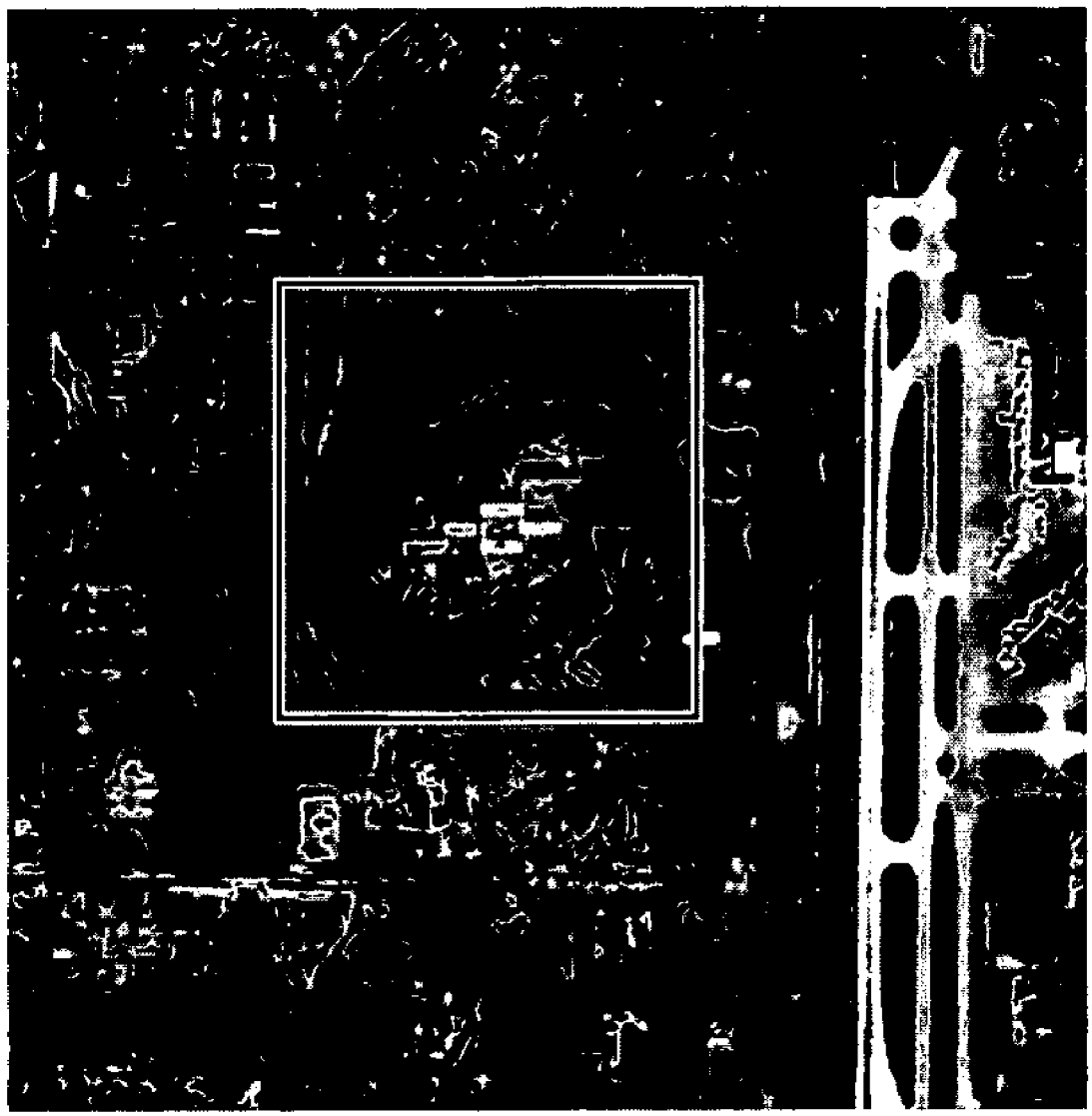

FIG. 13A depicts the original image. FIG. 13B depicts the original image compressed at the compression ratio of 1:5. FIG. 13C depicts the original image compressed at the compression ratio of 1:10. FIG. 13D depicts the original image compressed at a compression ratio of 1:20. FIG. 13E depicts the original image compressed at a compression ratio of 1:30. FIG. 13F depicts the original image compressed at a compression ratio of 1:50. FIG. 13G depicts a original image compressed at a compression ratio of 1:100. FIG. 13H depicts the original image compressed at a compression ratio of 1:150. FIG. 13I depicts the original image compressed at a compression ratio of 1:200.

A visual comparison of the images that are reconstructed with the original image shows that the reconstructed images lose some fine details as the compression ratio is increased. However, the original and the reconstructed image which is compressed at the ratio of 30 are undistinguishable when doing a visual inspection. But the differences are more pronounced after each successive increase in compression ratio.

Figure 14A:
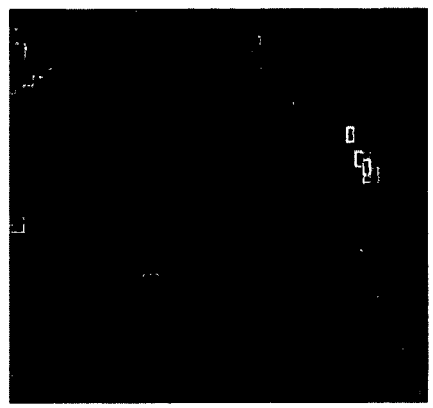
FIG. 14A depicts the original zoomed image of the original image depicted in FIG. 13A.
Figure 14B:
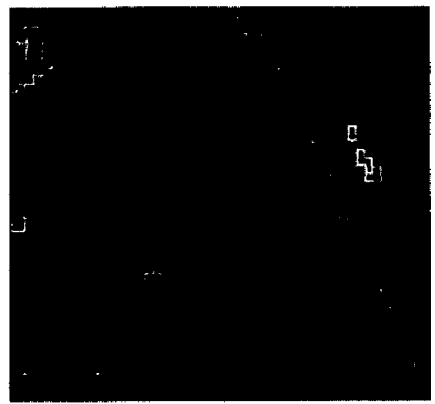
FIG. 14B-14K depict the original zoomed image compressed at various compression ratios.
Figure 14C:
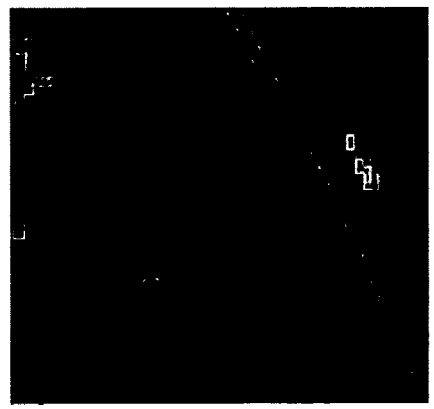
Figure 14D:
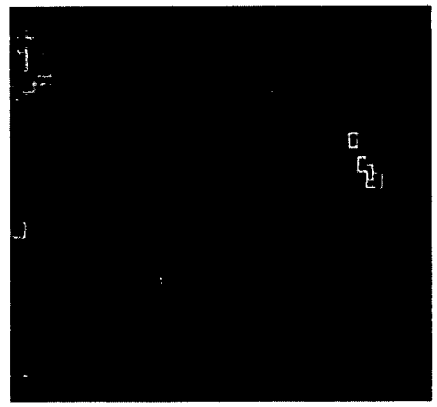
Figure 14E:
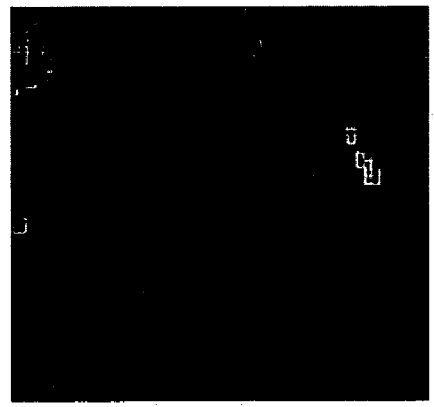
Figure 14F:
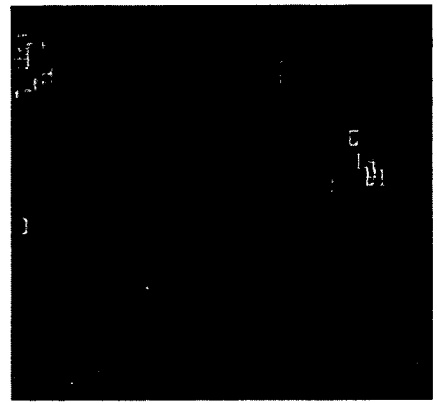
Figure 14G:
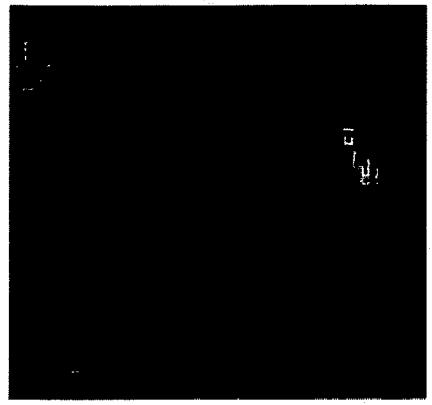
Figure 14H:
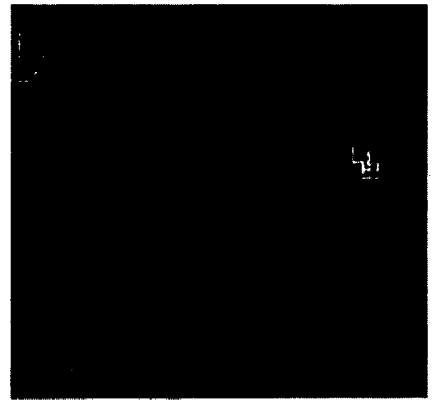
Figure 14I:
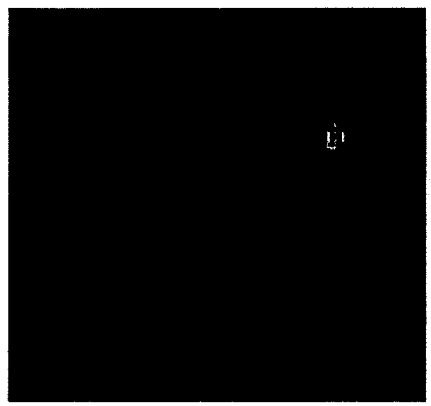
Figure 14J:
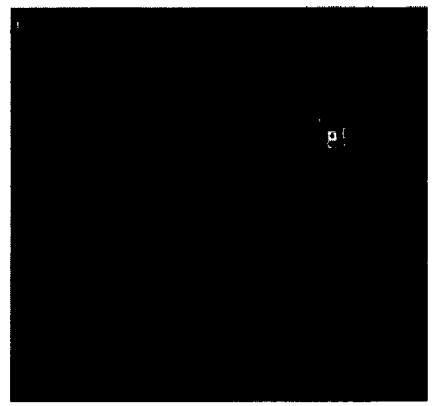
Figure 14K:
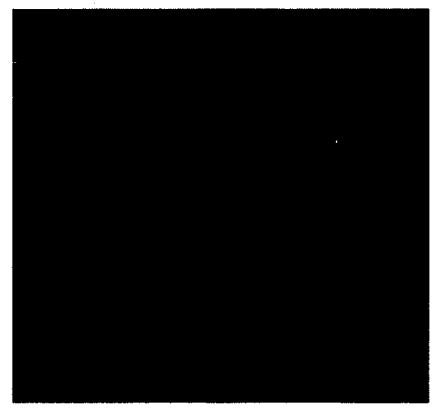

Similarly, when the above images are zoomed such that details are more visible, difference in various pixels can be seen as the encoding ratio increases. FIGS. 14A-K depict zoomed images with increasing compression ratios. FIG. 14A depicts the original zoomed image. FIG. 14B depicts the original zoomed image compressed at the compression ratio of 1:5. FIG. 14C depicts the original zoomed image compressed at the compression ratio of 1:10. FIG. 14D depicts the original zoomed image compressed at a compression ratio of 1:20. FIG. 14E depicts the original zoomed image compressed at a compression ratio of 1:30. FIG. 14F depicts the original zoomed image compressed at a compression ratio of 1:40. FIG. 14G depicts a original zoomed image compressed at a compression ratio of 1:50. FIG. 14H depicts the original zoomed image compressed at a compression ratio of 1:60. FIG. 14I depicts the original zoomed image compressed at a compression ratio of 1:100. FIG. 14J depicts the original zoomed image compressed at a compression ratio of 1:150. FIG. 14K depicts the original zoomed image compressed at a compression ratio of 1:200.

Even though the images seem to appear similar to the naked eye, quality metrics show that the images are being distorted as can be seen from the MSE and RMSE of the images that are provided in the TABLE 11 and the PSNR provided in the TABLE 12. Similarly the correlation coefficient is provided in TABLE 13.

TABLE 11

| Compression Ratio | Band 1 MSE | RMSE | Band 2 MSE | RMSE | Band 3 MSE | RMSE | Band 4 MSE | RMSE |
|---|---|---|---|---|---|---|---|---|
| Lossless | 0 | 0 | 0 | 0 | 0 | 0 | 0 | 0 |
| 2 | 0 | 0 | 0 | 0 | 0 | 0 | 0 | 0 |
| 3 | 11.4448 | 3.383 | 11.0364 | 3.3221 | 11.4331 | 3.3813 | 10.4425 | 3.2315 |
| 4 | 13.5028 | 3.6746 | 12.0749 | 3.4749 | 13.6729 | 3.6977 | 12.6368 | 3.5548 |
| 5 | 17.6446 | 4.2005 | 13.8873 | 3.7266 | 18.5525 | 4.3073 | 14.8448 | 3.8529 |
| 10 | 38.2085 | 6.1813 | 29.0712 | 5.3918 | 43.6054 | 6.6034 | 45.2104 | 6.7239 |
| 20 | 83.5791 | 9.1422 | 71.3339 | 8.4459 | 103.9162 | 10.1939 | 139.143 | 11.7959 |
| 30 | 116.0723 | 10.7737 | 117.408 | 10.8355 | 156.6261 | 12.515 | 267.2953 | 16.3492 |
| 40 | 156.4596 | 12.5084 | 167.5248 | 12.9431 | 215.1113 | 14.6667 | 374.4435 | 19.3505 |
| 50 | 188.6118 | 13.7336 | 243.0937 | 15.5915 | 293.9313 | 17.1444 | 432.1737 | 20.7888 |
| 100 | 315.9 | 17.7738 | 426.5 | 20.6514 | 483.6 | 21.9911 | 1003.4 | 31.676 |
| 150 | 353.6 | 18.8042 | 578.8 | 24.0581 | 632.8 | 25.155 | 1528.3 | 39.0937 |
| 200 | 432.9 | 20.8052 | 790.2 | 28.1101 | 836.7 | 28.9266 | 1813.7 | 42.5872 |

TABLE 12

| Compression Ratio | Band 1 | Band 2 | Band 3 | Band 4 |
|---|---|---|---|---|
| Lossless | ∞ | ∞ | ∞ | ∞ |
| 2 | ∞ | ∞ | ∞ | ∞ |
| 3 | 197.4314 | 197.7948 | 197.4417 | 198.348 |
| 4 | 195.7778 | 196.8955 | 195.6526 | 196.4407 |
| 5 | 193.1025 | 195.497 | 192.6008 | 194.8303 |
| 10 | 185.3762 | 188.1093 | 184.055 | 183.6935 |
| 20 | 177.5489 | 179.1331 | 175.3709 | 172.4518 |
| 30 | 174.2647 | 174.1502 | 171.2682 | 165.9233 |
| 40 | 171.2788 | 170.5955 | 168.0952 | 162.5524 |
| 50 | 169.4099 | 166.8723 | 164.9733 | 161.1185 |
| 100 | 164.2522 | 161.2512 | 159.9941 | 152.6956 |
| 150 | 163.1252 | 158.1974 | 157.3056 | 148.4876 |
| 200 | 161.1028 | 155.0842 | 154.5116 | 146.7757 |

TABLE 13

| Compression Ratio | Band 1&2 | Band 1&3 | Band 1&4 | Band 2&3 | Band 2&4 | Band 3&4 |
|---|---|---|---|---|---|---|
| Original | 0.9863 | 0.9446 | 0.6589 | 0.9769 | 0.7289 | 0.8027 |
| Lossless | 0.9863 | 0.9446 | 0.6589 | 0.9769 | 0.7289 | 0.8027 |
| 2 | 0.9863 | 0.9446 | 0.6589 | 0.9769 | 0.7289 | 0.8027 |
| 3 | 0.9858 | 0.9441 | 0.6594 | 0.9767 | 0.7295 | 0.8032 |
| 4 | 0.9855 | 0.9433 | 0.6585 | 0.9765 | 0.7293 | 0.803 |
| 5 | 0.9852 | 0.9429 | 0.6582 | 0.9766 | 0.7291 | 0.8029 |
| 10 | 0.9849 | 0.9432 | 0.6594 | 0.9776 | 0.7287 | 0.8023 |
| 20 | 0.983 | 0.9462 | 0.6649 | 0.9801 | 0.7277 | 0.7973 |
| 30 | 0.9808 | 0.9468 | 0.6664 | 0.9809 | 0.7258 | 0.794 |
| 40 | 0.9776 | 0.9463 | 0.6684 | 0.9818 | 0.7246 | 0.7896 |
| 50 | 0.9756 | 0.9462 | 0.67 | 0.9821 | 0.7198 | 0.7833 |
| 100 | 0.9674 | 0.946 | 0.6773 | 0.9845 | 0.7186 | 0.7744 |
| 150 | 0.9667 | 0.9473 | 0.6723 | 0.9853 | 0.7173 | 0.7714 |
| 200 | 0.964 | 0.9473 | 0.6782 | 0.9863 | 0.7172 | 0.7672 |

Figure 15:
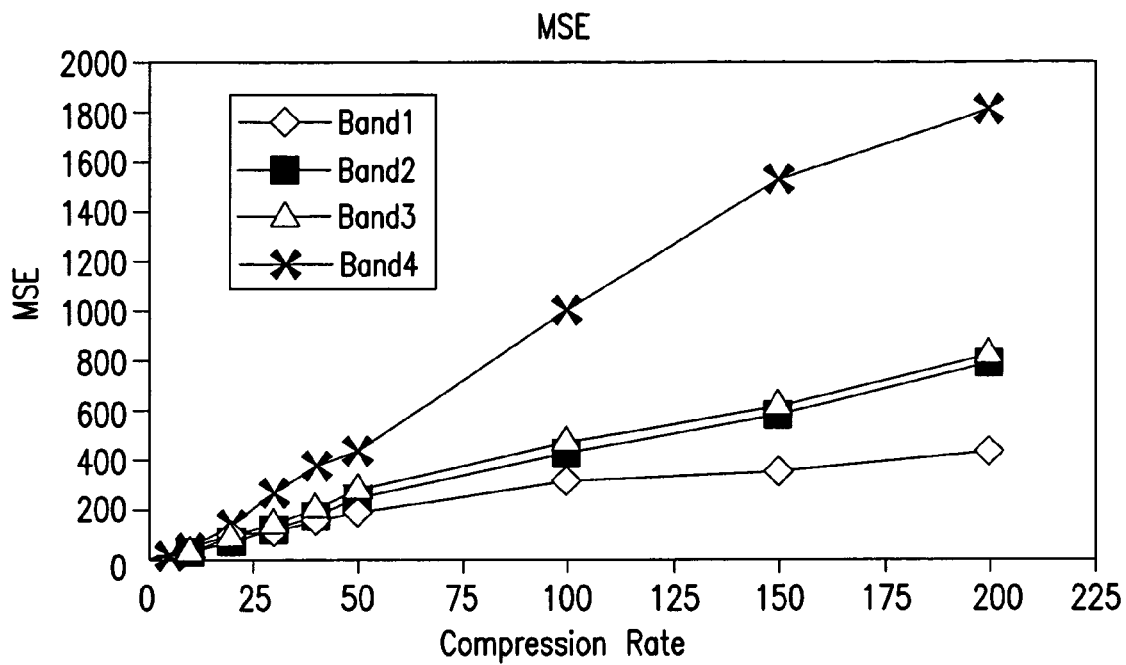
FIG. 15 is a plot of mean square error values versus compression ratio for various bands in images shown in FIGS. 13A-13I and 14A-14K.
Figure 16:
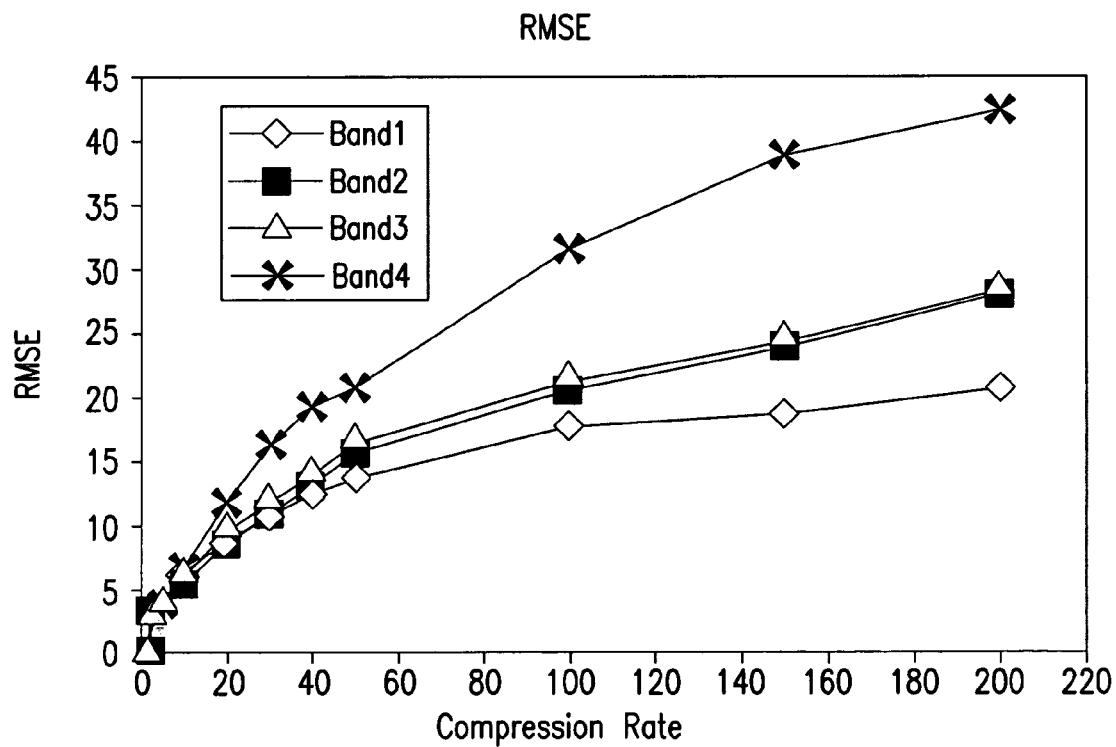
FIG. 16 is a plot of root mean square values versus compression ratio for various bands in the images shown in FIGS. 13A-13I and 14A-14K.
Figure 17:
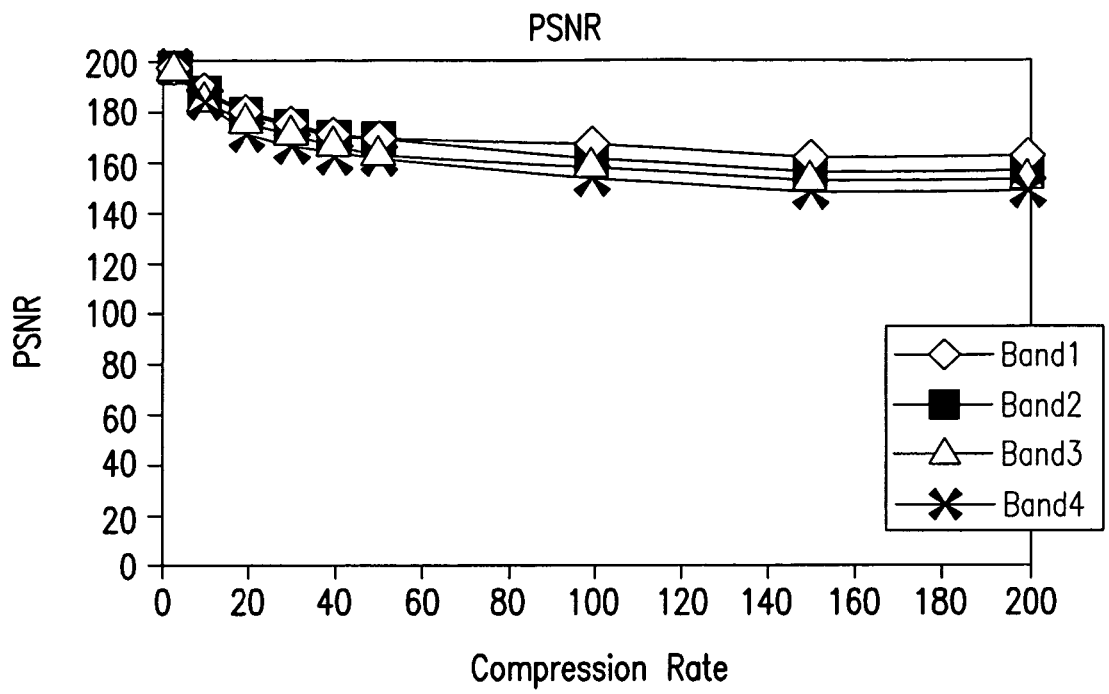
FIG. 17 is a plot of peak signal to noise ratios versus compression ratio for bands in the images shown in FIGS. 13A-13I and 14A-14K.
Figure 18:
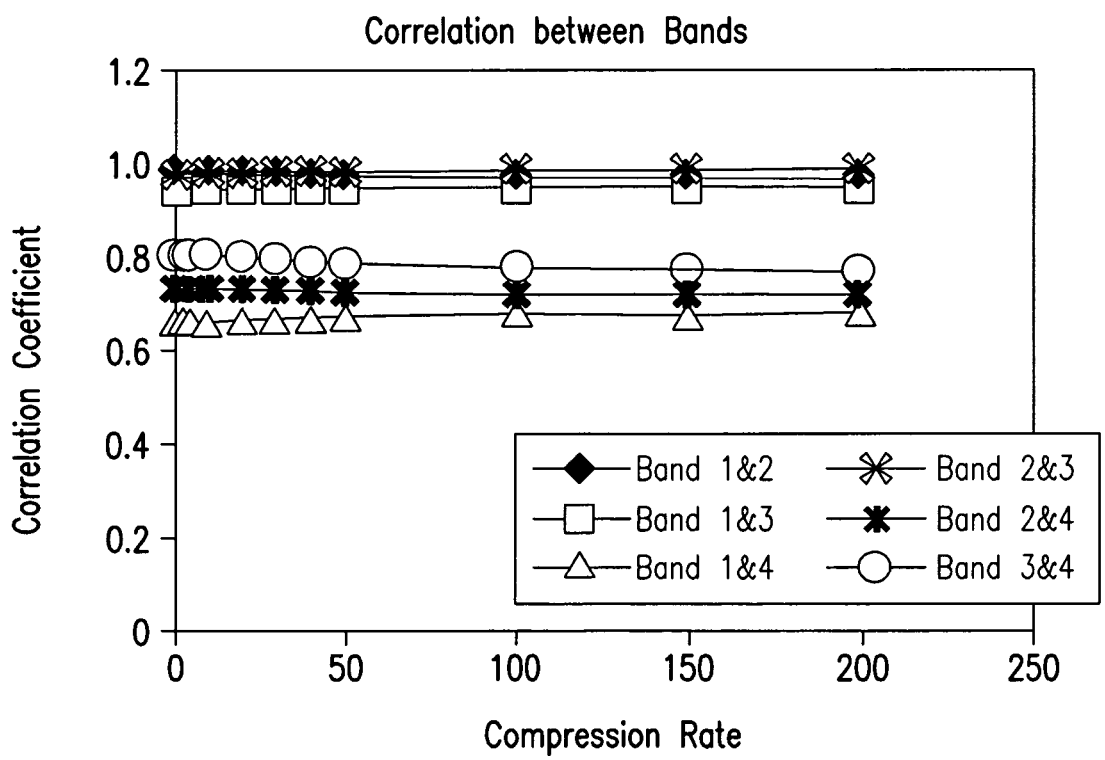
FIG. 18 is a plot of correlation between bands versus compression ratio.

FIG. 15 is a plot of MSE values versus compression ratio for various bands (band 1, band 2, band 3 and band 4) in the images. FIG. 16 is a plot of RMSE values versus compression ratio for various bands in the images. FIG. 17 is a plot of PSNR values versus compression ratio for bands in the images. FIG. 18 is a plot of correlation between bands (bands 1 and 2, bands 1 and 3, bands 1 and 4, bands 2 and 3, bands 2 and 4 an and 4) versus compression ratio.

As expected, the MSE and RMSE are equal to 0 and PSNR is infinity when lossless compression is performed. Lossless compression reduces the size of the image around a factor of 2. Therefore, a lossy compression ratio of 2 performs as well as lossless compression. As the encoding ratio increases, the MSE and RMSE values also increase accordingly, implying that the distortion in the image increases as the compressed image gets smaller in size, which go along with the theoretical expectations.

Another interesting fact observed is that the fourth band (near Infrared) had the maximum values of MSE and RMSE, which is also understandable as that band contains larger pixel values and therefore is further distorted when compared to the other bands.

Similarly PSNR values decrease as the compression ratio increases. For comparable values of PSNR, from a compression ratio 0.33 to 0.005 its value ranges from 197.43 db to 161.1 db in band 1, which shows a range of 36.33. Furthermore, it can be seen that PSNR value decreases most in the fourth band.

However, an interesting fact observed is that the correlation between the different bands of images does not change by much even when the compression is performed at a ratio of 1:200. As can be seen from FIG. 18 and the TABLE 13, the correlation between different bands don't exhibit much difference, i.e., remains substantially constant. This shows that the distortion is comparable among the bands.

In the following paragraphs a method and system for analyzing and estimating horizontal accuracy in imaging systems such as mapping and the like is described.

Mechanical limitations of instrument, sensor position and orientation, curvature of the earth and unforeseen human errors are some of the sources for mapping inaccuracies that are usually encountered in mapping (e.g., geospatial mapping) or imaging processes. One such spatial discrepancy is the horizontal positional inaccuracy of the remotely acquired image. Due to the aforementioned sources of errors, the horizontal positional information of an object obtained from a remotely acquired image may deviate from its true real world measurement. Although some of the potential causes for spatial errors can be substantially eliminated or reduced, estimation and/or evaluation of horizontal inaccuracies may be needed to assess the reliability of the information retrieved from the image.

The horizontal positional error of an object can be represented by a random variable pair (x, y). The random variables x and y correspond to the error encountered in the X (longitude) and Y (latitude) directions respectively. The error can be considered as a deviation of the measured values from the true values. The two random variables can be assumed to be independent, with a Gaussian distribution and zero mean. The joint probability density distribution for these random variables (x, y) is given by the following equation (10).

$$p(x, y) = \frac{1}{2\pi\sigma_x\sigma_y} e^{-\frac{1}{2}\left(\frac{x^2}{\sigma_x^2} + \frac{y^2}{\sigma_y^2}\right)} \tag{10}$$

By rearranging equation (10), equation (11) is obtained.

$$-2\ln[p(x, y)2\pi\sigma_x\sigma_y] = \left(\frac{x^2}{\sigma_x^2} + \frac{y^2}{\sigma_y^2}\right) \tag{11}$$

As it can be observed from equation (11) for a given value (x, y) the probability density function represents the square of the radius of circle assuming that variances ($\sigma_x$ and $\sigma_y$) in both the dimensions are equal. The probability for an error random variable pair (x, y) to be contained within a circle of radius R can be defined by the circular error probability function P(R). The circular error probability function can be derived from equation (11). A condensed form for P(R) for the case when $\sigma_x$ and $\sigma_y$ are equal is given by the following equation (12).

$$P(R) = 1 - e^{-\frac{R^2}{2\sigma_c^2}} \tag{12}$$

where $\sigma_x=\sigma_y=\sigma_c$ and R is the radial distance.

The National Map Accuracy Standard (NMAS) specifies that 90% of well-defined points in an image or map should fall within a certain radial distance R. Therefore, substituting the left hand side of equation (12) with 0.90 yields the horizontal accuracy standard as specified by NMAS which is given by the following equation (13).

$$CE_{90}=2.1460\sigma_c \tag{13}$$

where $\sigma_x=\sigma_y=\sigma_c$.

The calculation for $\sigma_x$ is shown below.

$$\sigma_x = \sqrt{\frac{\sum(x_{image} - x_{realworld})^2}{n}} \tag{14}$$

where $x_{image}$ and $x_{realworld}$ are the coordinates of the control points measured from the image and real world respectively, and n is the number of such control points. $\sigma_y$ is calculated similar to equation (14).

$$\sigma_y = \sqrt{\frac{\sum(y_{image} - y_{realworld})^2}{n}} \tag{15}$$

where $y_{image}$ and $y_{realworld}$ are the coordinates of the control points measured from the image and real world respectively, and n is the number of such control points.

For cases where $\sigma_x$ and $\sigma_y$ are not equal, the error distribution takes on a more elliptical shape rather than being truly circular. Although this is the case, it can be shown that a Gaussian circular distribution can be still substituted for N elliptical distribution for certain $$\frac{\sigma_{min}}{\sigma_{max}}$$

ratios, where $\sigma_{min}$ is the minimum value between $\sigma_x$ and $\sigma_y$, and $\sigma_{max}$ is the maximum value between $\sigma_x$ and $\sigma_y$.

For cases where $\sigma_x$ and $\sigma_y$ are not equal and $$\frac{\sigma_{min}}{\sigma_{max}}$$

ratio is between 0.6 and 1.0, it can be shown that $\sigma_c$ is estimated by a linear combination of $\sigma_x$ and $\sigma_y$ as given by the following equation (16).

$$\sigma_c=0.5222\sigma_{min}+0.4778\sigma_{max} \tag{16}$$

where $\sigma_{min}$ is the minimum value between $\sigma_x$ and $\sigma_y$, and $\sigma_{max}$ is the maximum value between $\sigma_x$ and $\sigma_y$. A further approximation of (15) is given in equation (17), which is adopted by NSSDA (Federal Geographic Data Committee 1988) for United States standard for spatial data.

$$\sigma_c=0.5(\sigma_{min}+\sigma_{max}) \tag{17}$$

For cases where $\sigma_x$ and $\sigma_y$ are not equal and $$\frac{\sigma_{min}}{\sigma_{max}}$$

ratio is between 0.2 and 0.6, $\sigma_c$ is estimated using an interpolated value from statistical data that relates $$\frac{\sigma_{min}}{\sigma_{max}} \text{ to } \frac{\sigma_c}{\sigma_{max}}.$$

A computer algorithm (CE$_{90}$ TOOLKIT version 1.0) is developed to allow a user to automate circular error distribution analysis procedures. In an embodiment of the invention, the computer code is written in Matlab. However, it must be appreciated that other computer languages and/or computer mathematical packages may be used.

The coordinates for the ground control points (GCP), which are obtained from the remotely acquired image and measured using the global positioning system (GPS) can be loaded into the toolkit (code) as input files or through data entry forms.

Figure 19:
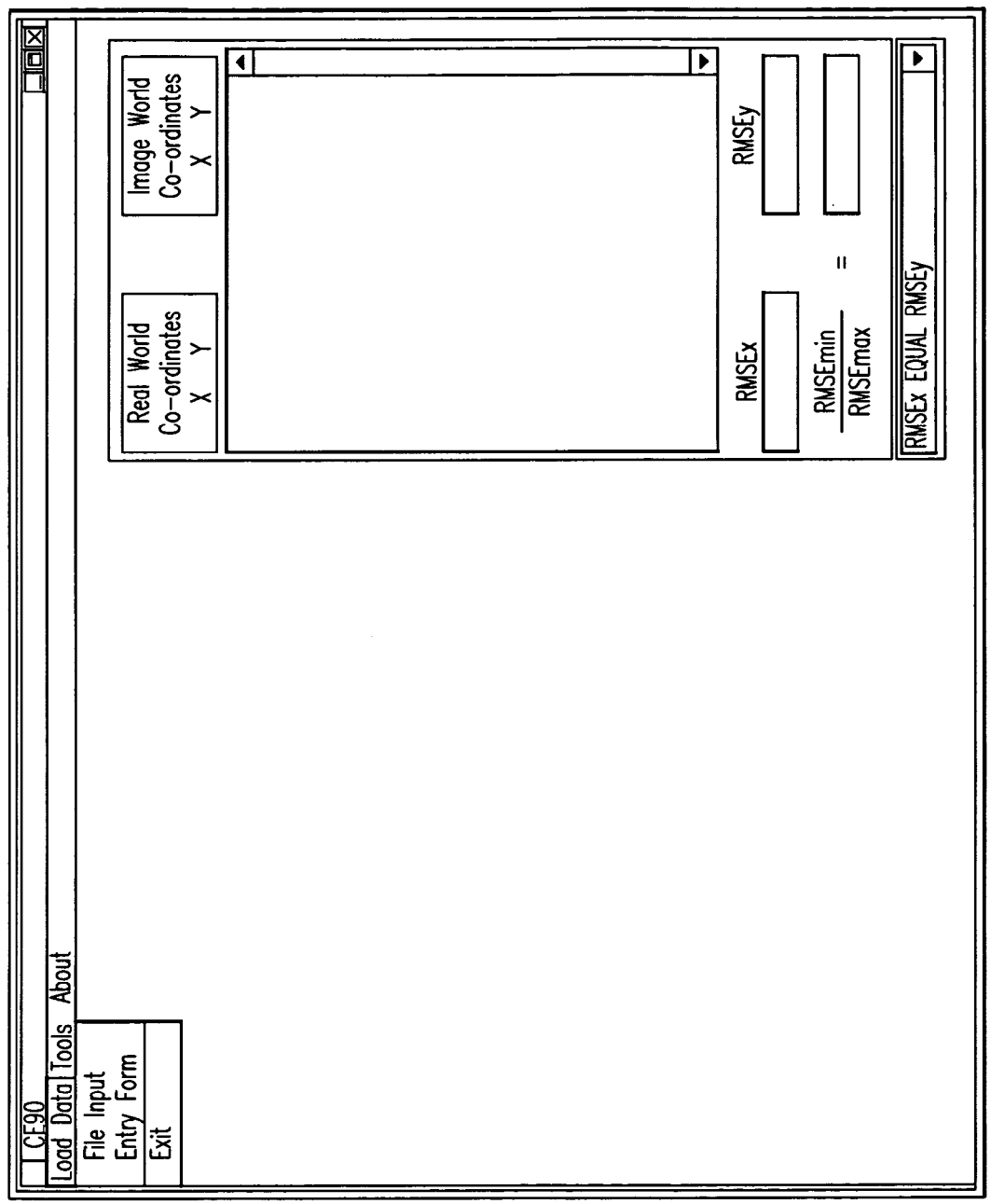
FIG. 19 depicts a graphical user interface of $CE_{90}$ toolkit, according to an embodiment of the present invention.
Figure 20:
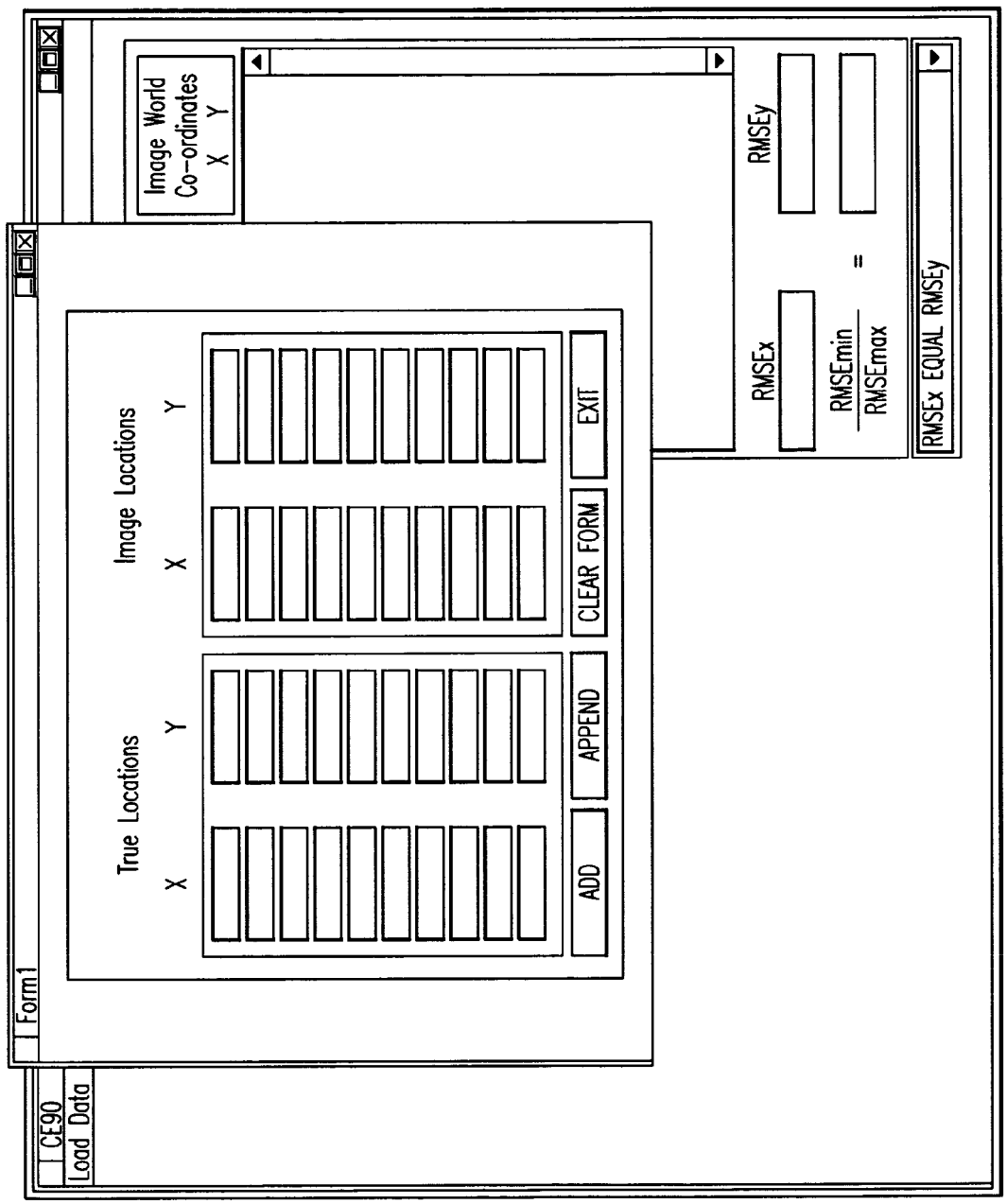
FIG. 20 depicts a data entry form of the $CE_{90}$ toolkit, according to an embodiment of the present invention.

In an embodiment of the invention, the CE90 toolkit includes a graphical user interface (GUI). The graphical user interface is shown in FIG. 19. The data entry form is shown in FIG. 20. Upon loading the data using either of the data input methods, by inputting true locations (realworld locations) and image locations, the data is displayed on the data list window as shown in FIG. 21. Along with the data listing, the root mean square error in both the directions, $\sigma_x$ and $\sigma_y$ are calculated and displayed (RMSEx and RMSEy in FIG. 21). The $$\frac{\sigma_{min}}{\sigma_{max}}.$$

ratio is also calculated and displayed on the user interface (RMSEmin/RMSEmax in FIG. 21).

In an embodiment of the invention, the graphical user interface is configured to interactively tie a GPS point to a point in the imagery. The results may be stored in a simple text file or other file formats. The values are computed based on the points interactively chosen.

The images were automatically stretched to enhance contrast and easily visualize the image data. This functionality is added just for display purposes only.

Figure 22:
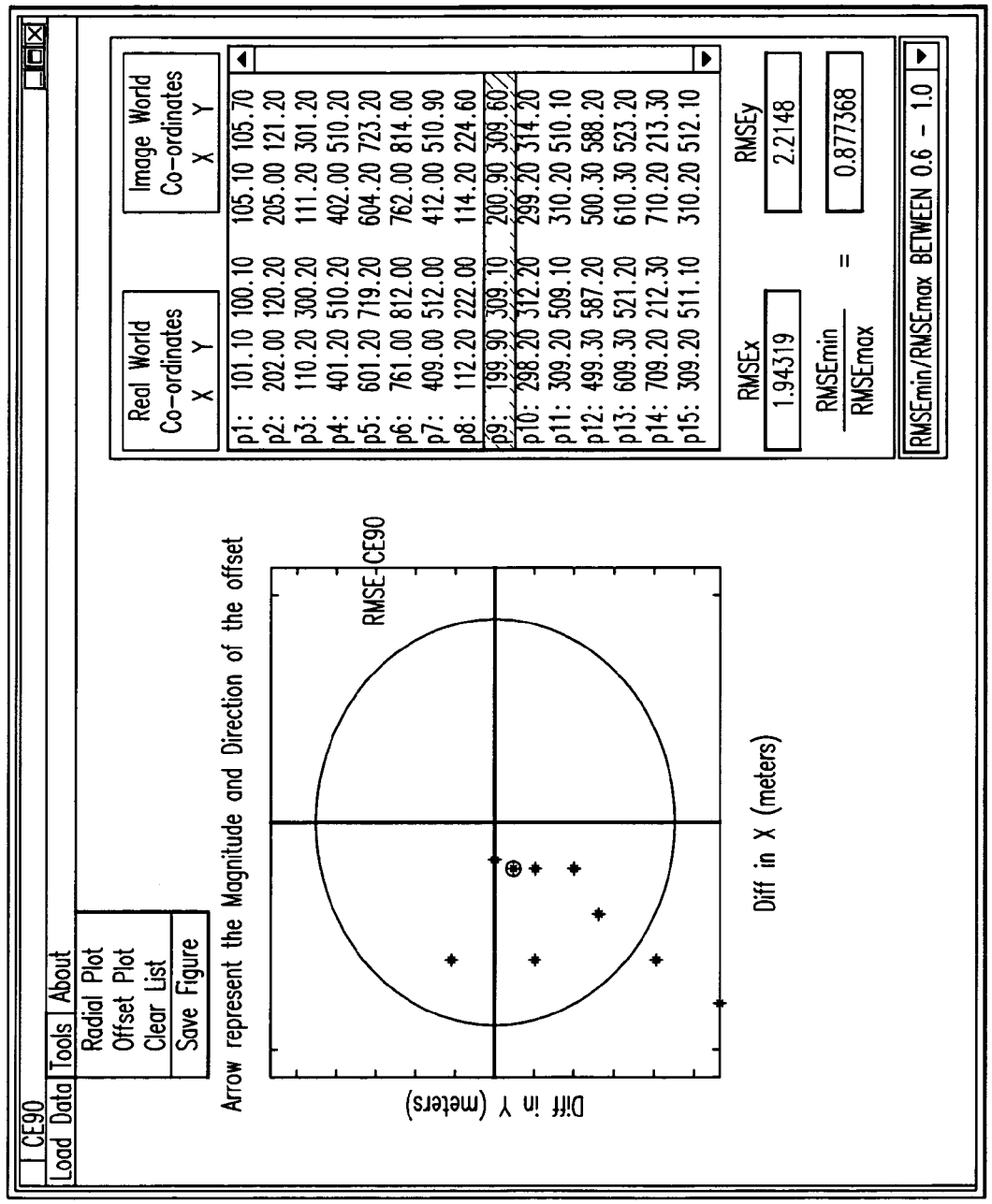
FIG. 22 shows an example with a circle representing the $CE_{90}$ radius calculated according to the horizontal accuracy standard.

In an embodiment of the invention, to perform an error distribution analysis, a user can choose options from the tools pull-down menu. The tools pull-down menu allows the user to select radial plot or vector plot options as shown in FIG. 22. The radial plot option allows the user to generate error distribution plots, where the user can visually verify where these positional errors fall with respect to the CE$_{90}$ value estimated using equation (13). However, the value may also be computed using different parameters. For example instead of using 2.1460 $\sigma_c$ (when a value of 90% of well-defined points in an image is specified), a 2.4477 $\sigma_c$ (when a value of 95% of well defined points in an image is specified) can be used.

An example case is shown in FIG. 22. The user can select the data points by highlighting them on the data list window as shown in FIG. 21. The graphical user interface also allows to display the method that is used to calculate the CE$_{90}$ value. In this example the $$\frac{\sigma_{min}}{\sigma_{max}}$$

ratio is found to be between 0.6 and 0.1 and hence corresponding strategy is adopted in the estimation of $\sigma_c$. The circle in FIG. 22 represents the CE$_{90}$ radius calculated according to equation (13).

Figure 23:
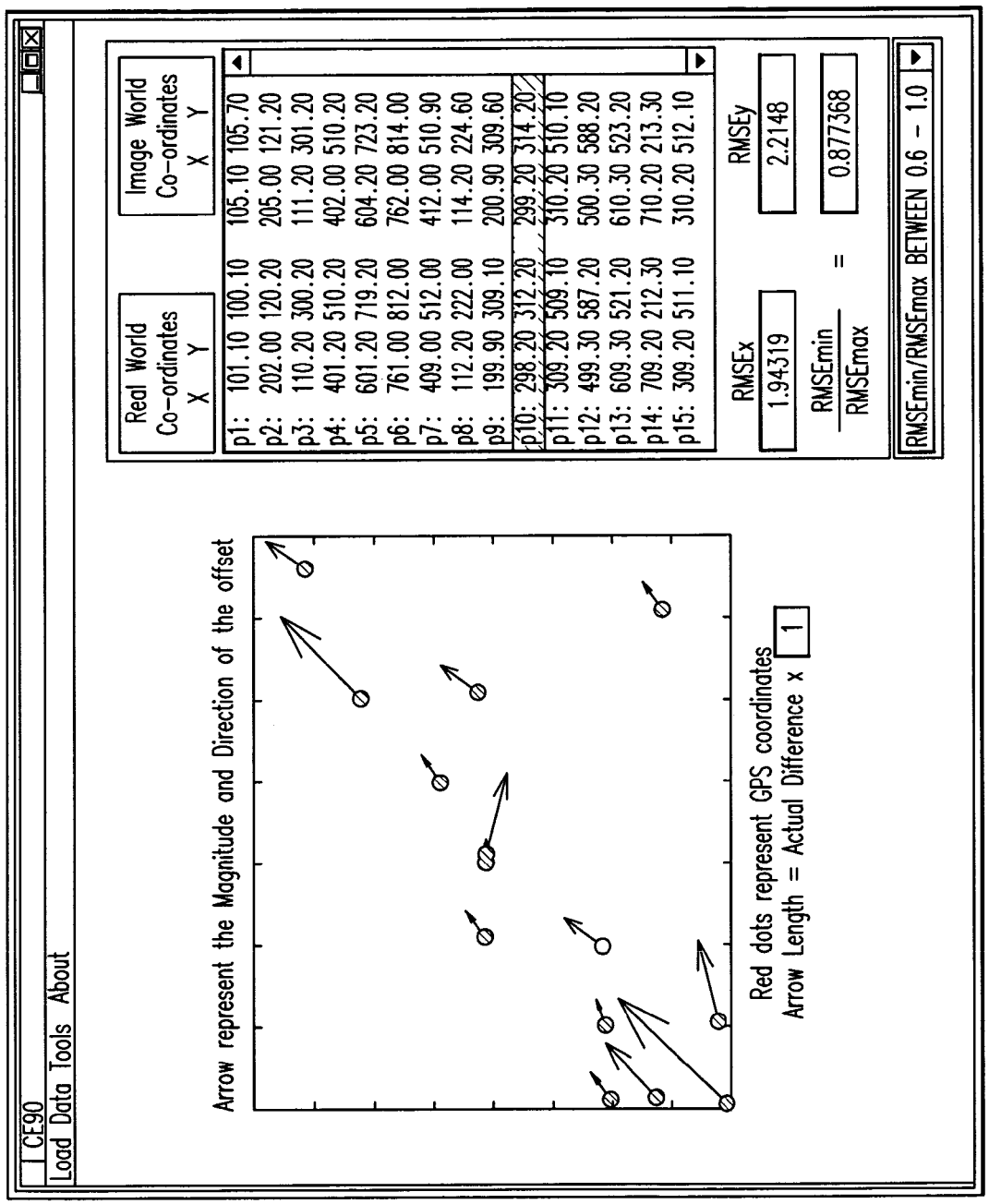
FIG. 23 shows the offset vector plot generated by the $CE_{90}$ toolkit.

In addition, in an embodiment of the invention, the CE$_{90}$ graphical user interface allows the user to display the offset vector plot, which represents the magnitude and direction of the error random variables (x, y). This is done by choosing the offset plot from the tools pull-down menu. The user can also input an appropriate scale value to make the error magnitude and directions more visible. FIG. 23 shows the offset vector plot generated by CE$_{90}$ toolkit.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments.

Moreover, the methods and systems of the present invention, like related systems and methods used in the imaging arts are complex in nature, are often best practiced by empirically determining the appropriate values of the operating parameters, or by conducting computer simulations to arrive at best design for a given application. Accordingly, all suitable modifications, combinations and equivalents should be considered as falling within the spirit and scope of the invention.

In addition, it should be understood that the figures, are presented for example purposes only. The architecture of the present invention is sufficiently flexible and configurable, such that it may be utilized in ways other than that shown in the accompanying figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

What is claimed is:

1. A method for analyzing and estimating horizontal accuracy in georeferenced images, the method comprising:
    inputting into a computer-based device remotely acquired georeferenced images, photo-identified locations from georeferenced images, and real world survey locations of objects on the surface of the earth in x and y directions;
    calculating using a computer-based device an offset error between georeferenced image locations and real world survey locations of objects on the surface of the earth in both x and y directions;
    deriving a root mean square error from the calculated offset error in the x and y directions;
    deriving a circular error probability from the derived root mean square error in the x and y directions; and
    computing using a computer-based device the horizontal accuracy between georeferenced image locations and real world survey locations of objects on the surface of the earth by using the root mean square error in the x and y directions and circular error probability for geolocation mapping of object locations on the surface of the earth.

2. The method of claim 1, wherein the analyzing and estimating of the horizontal accuracy further comprises calculating a set of statistical and mathematical accuracy metrics which further comprises:

determining circular error probability wherein 90% of well-defined points in an image or map should fall within a certain radial distance ($CE_{90}$), wherein $CE_{90} = 2.1460\sigma_c$;

determining circular error probability wherein 95% of well-defined points in an image or map should fall within a certain radial distance ($CE_{95}$), wherein $CE_{95} = 2.4477\sigma_c$;

and wherein $\sigma_x = \sigma_y = \sigma_c$ and the root mean square error in X and Y are calculated as $$\sigma_x = \sqrt{\frac{\sum (x_{image} - x_{realworld})^2}{n}} \quad \sigma_y = \sqrt{\frac{\sum (y_{image} - y_{realworld})^2}{n}}$$

and $x_{image}$ and $x_{realworld}$ and $y_{image}$ and $y_{realworld}$ are coordinates from photo-identifiable points in the georeferenced image and survey points from the real world and n is the number of control points;

estimating $\sigma_c$, where $\sigma_x$ and $\sigma_y$ are not equal, by a linear combination of $\sigma_x$ and $\sigma_y$; and estimating $\sigma_c$, where the $$\frac{\sigma_{min}}{\sigma_{max}}$$

ratio is between 0.6 and 1.0, by a linear combination of $\sigma_x$ and $\sigma_y$ where $\sigma_c = 0.5222\sigma_{min} + 0.4778\sigma_{max}$ and where the $$\frac{\sigma_{min}}{\sigma_{max}}$$

ratio is less than 0.6, interpolated coefficients are utilized to produce varying linear combinations of $\sigma_x$ and $\sigma_y$, where $\sigma_{min}$ is the minimum value between $\sigma_x$ and $\sigma_y$ and $\sigma_{max}$ is the maximum value between $\sigma_x$ and $\sigma_y$.

* * * * *